(12) United States Patent
Yadav

(10) Patent No.: US 8,644,644 B2
(45) Date of Patent: Feb. 4, 2014

(54) METHODS AND APPARATUS FOR BLENDING IMAGES

(75) Inventor: Vikas Yadav, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 894 days.

(21) Appl. No.: 12/559,214

(22) Filed: Sep. 14, 2009

(65) Prior Publication Data

US 2013/0121569 A1    May 16, 2013

(51) Int. Cl.
*G06K 9/36* (2006.01)

(52) U.S. Cl.
USPC ........... 382/284; 382/173; 345/441; 345/592; 345/629

(58) Field of Classification Search
USPC .......................................... 382/284, 298–300
See application file for complete search history.

(56) References Cited

U.S. PATENT DOCUMENTS

| | | | | |
|---|---|---|---|---|
| 5,651,107 | A * | 7/1997 | Frank et al. .................. | 715/768 |
| 5,701,365 | A * | 12/1997 | Harrington et al. ........... | 382/212 |
| 5,767,860 | A * | 6/1998 | Zimmer et al. ................ | 345/441 |
| 6,348,924 | B1 * | 2/2002 | Brinsmead .................... | 345/441 |
| 6,456,323 | B1 * | 9/2002 | Mancuso et al. ........... | 348/218.1 |
| 6,636,647 | B1 * | 10/2003 | Ohki et al. .................... | 382/284 |
| 6,803,923 | B1 * | 10/2004 | Hamburg ...................... | 345/629 |
| 7,133,054 | B2 * | 11/2006 | Aguera y Arcas ............ | 345/666 |
| 7,532,770 | B2 | 5/2009 | Pfister | |
| 7,602,991 | B2 * | 10/2009 | Kokemohr ................... | 382/260 |
| 7,633,511 | B2 * | 12/2009 | Shum et al. ................... | 345/628 |
| 7,653,261 | B2 * | 1/2010 | Blake et al. ................... | 382/284 |
| 8,270,764 | B1 * | 9/2012 | Agarwala et al. ............. | 382/284 |
| 2002/0061131 | A1 * | 5/2002 | Sawhney et al. .............. | 382/154 |
| 2003/0043390 | A1 * | 3/2003 | Fritz et al. ...................... | 358/1.9 |
| 2003/0113035 | A1 * | 6/2003 | Cahill et al. .................. | 382/284 |
| 2004/0184667 | A1 * | 9/2004 | Raskar et al. ................. | 382/254 |
| 2005/0219264 | A1 * | 10/2005 | Shum et al. ................... | 345/629 |
| 2006/0104542 | A1 * | 5/2006 | Blake et al. ................... | 382/284 |
| 2006/0109284 | A1 * | 5/2006 | Hsieh et al. ................... | 345/639 |
| 2006/0177150 | A1 * | 8/2006 | Uyttendaele et al. ......... | 382/284 |
| 2007/0071341 | A1 * | 3/2007 | Pfister .......................... | 382/254 |
| 2007/0103483 | A1 * | 5/2007 | Glen ............................. | 345/592 |
| 2007/0110335 | A1 * | 5/2007 | Taylor et al. .................. | 382/284 |
| 2011/0052093 | A1 * | 3/2011 | Porter ........................... | 382/284 |
| 2013/0121569 | A1 * | 5/2013 | Yadav .......................... | 382/164 |

OTHER PUBLICATIONS

"Using Adobe® Photoshop® CS4", pp. i and ii, Ch. 9, Selecting and masking, pp. 251-282, Ch, 10: Layers, pp. 283-331, 2008 Adobe Systems, Incorporated (updated Sep. 11, 2009).

* cited by examiner

*Primary Examiner* — Gandhi Thirugnanam
(74) *Attorney, Agent, or Firm* — Wolfe-SBMC

(57) ABSTRACT

Methods and apparatus for blending regions from multiple images to produce a blended image. An image blending module may obtain multiple digital images of a scene. A base image and a source image are selected, and a stroke is applied to the source image to indicate a desired region which is to be blended with the base image. A region in the source image is identified from the stroke using a segmentation technique such as a graph cut algorithm, and the identified region is blended with the corresponding region of the base image, for example using alpha blending. Additional strokes may be applied to the source image to select other regions to be blended with the base image. A different image may be selected as a source image, and a region from the different image may be selected for blending with the base image.

20 Claims, 33 Drawing Sheets

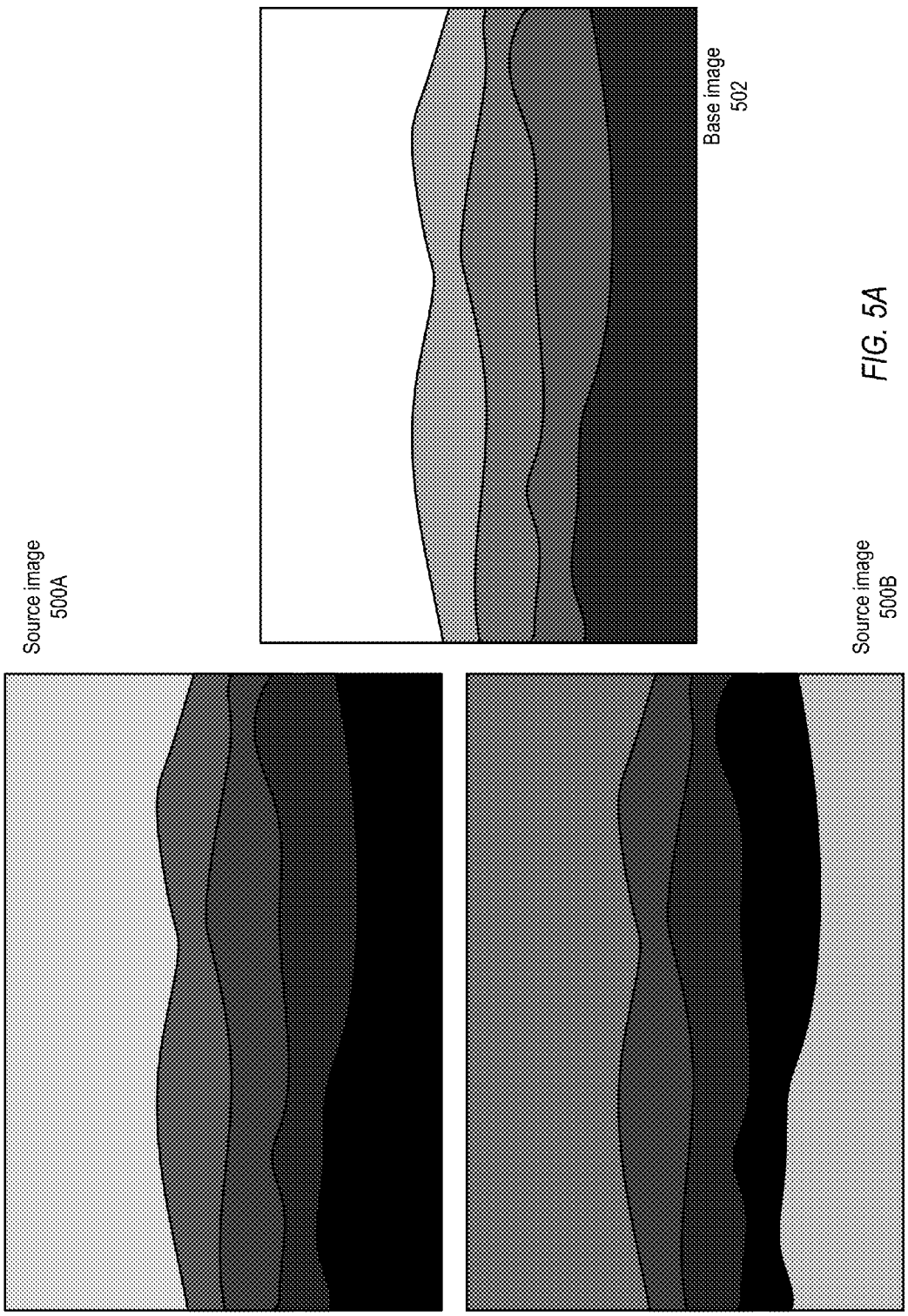

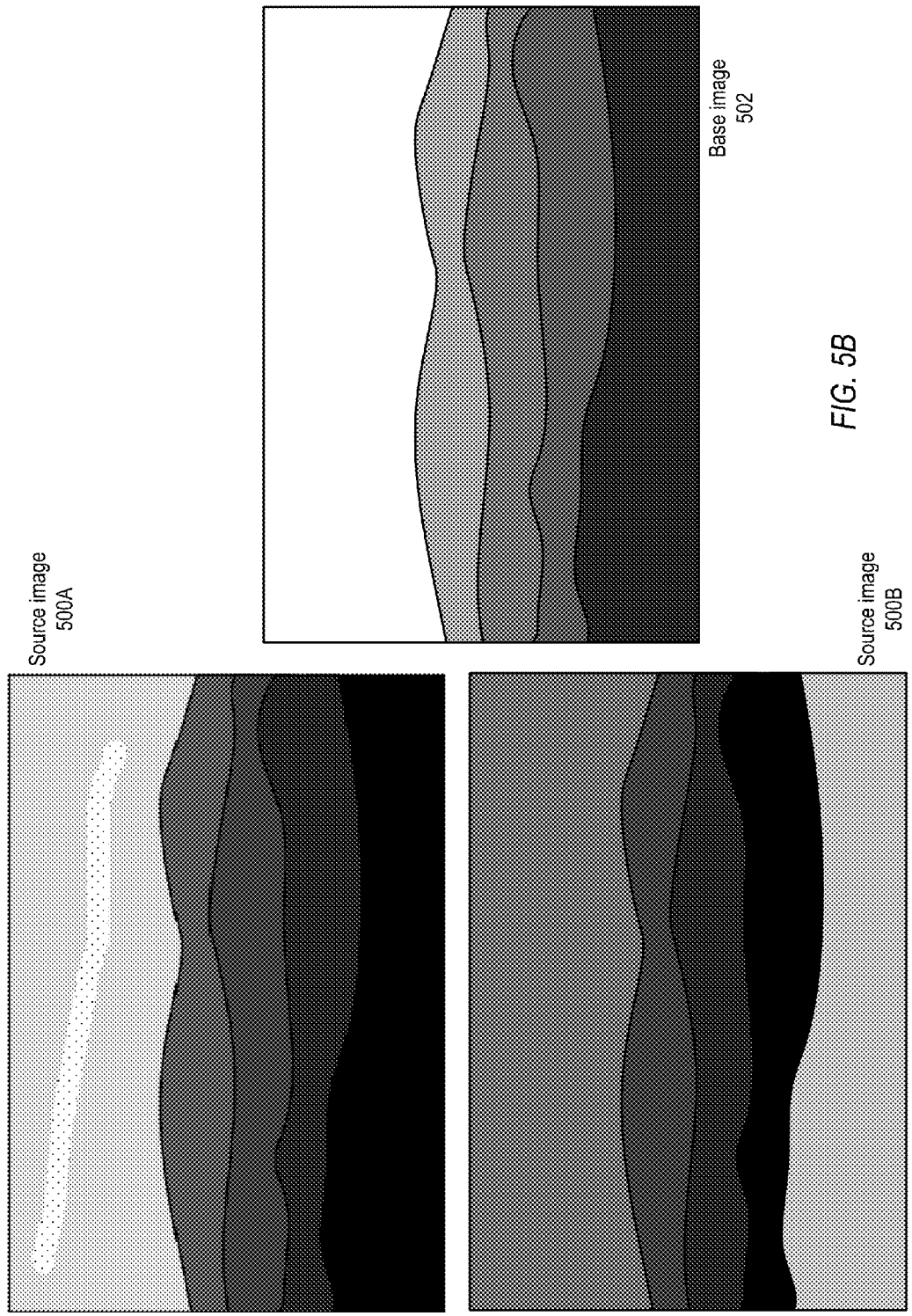

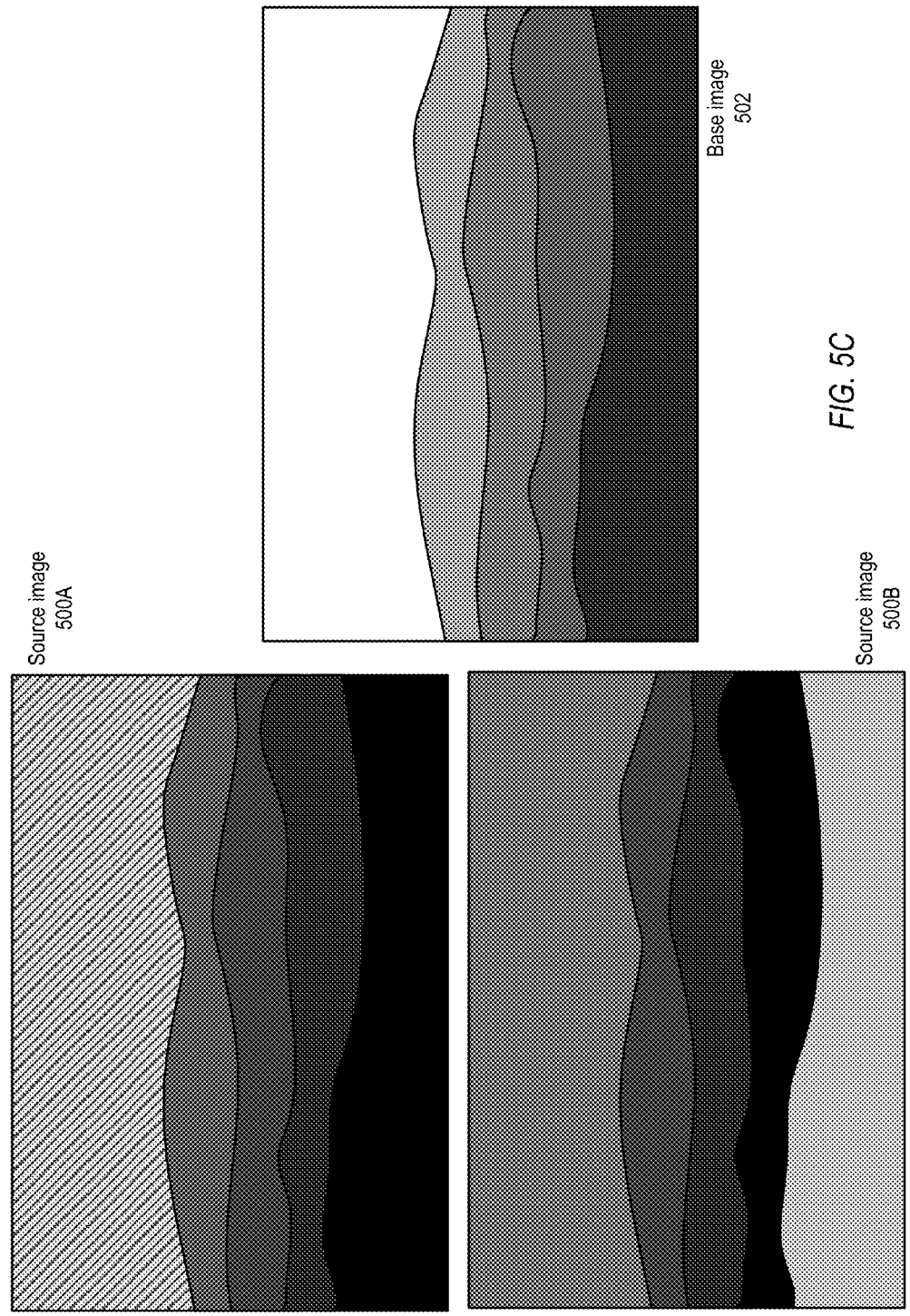

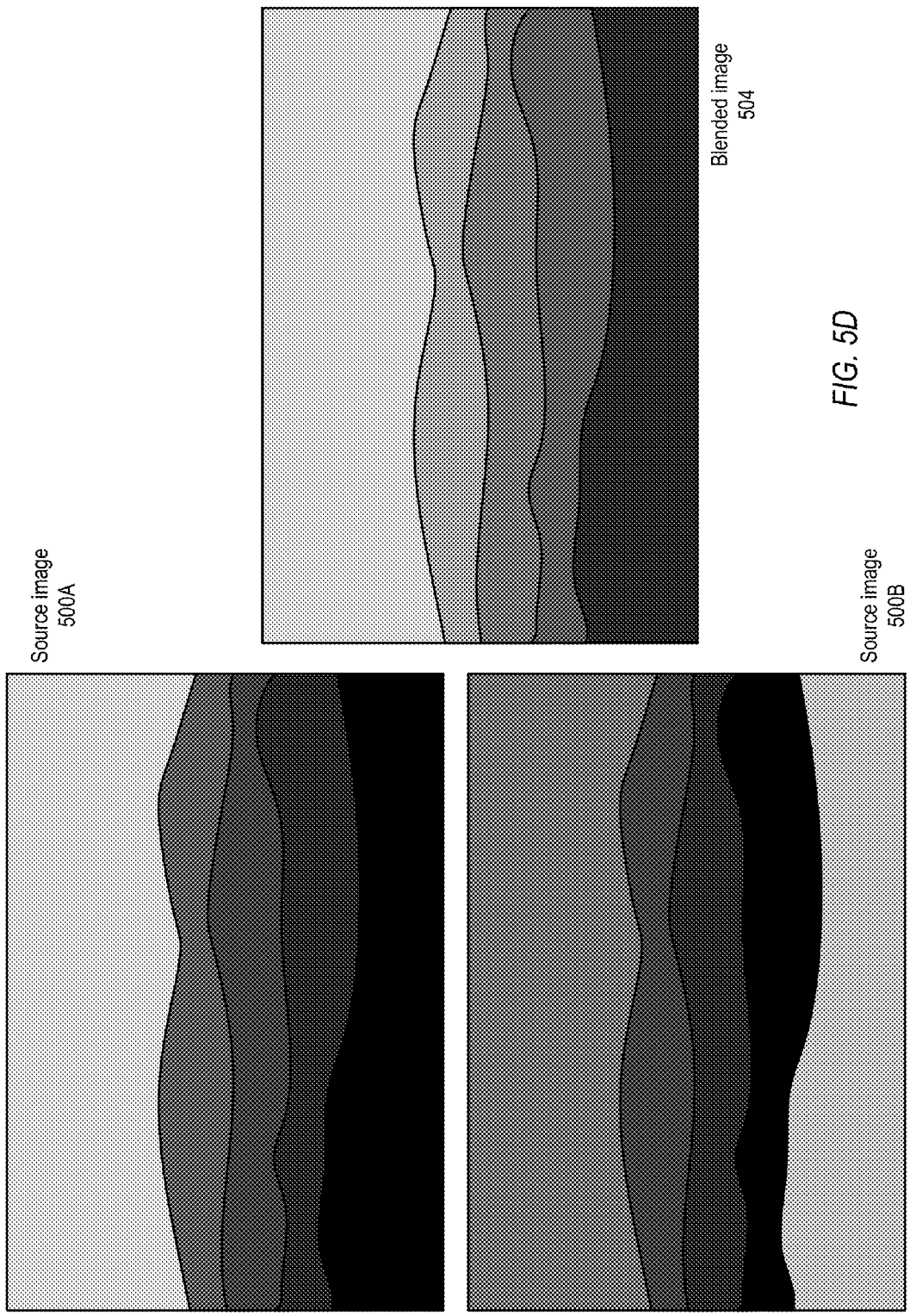

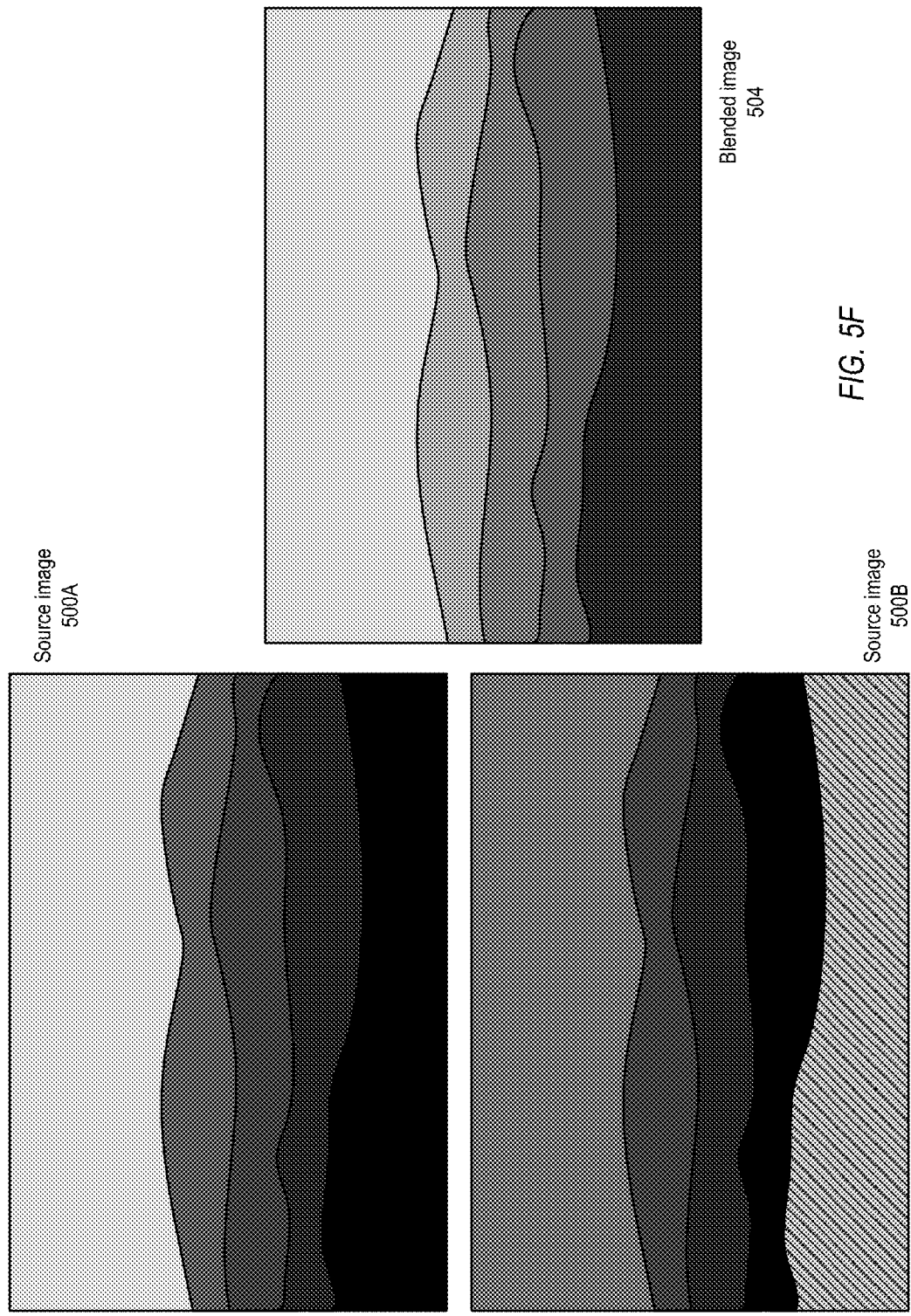

Source image 700

Base image 702

Source image 700

Base image 702

Source image 700

Blended base image 704 alpha blending level

Source image 706

Blended base image 704 alpha blending level

Source image 700

Blended base image 704 alpha blending level

Source image 700

Blended base image 704 alpha blending level

Source image 700

Blended base image 704

[X] Show strokes

[X] Show regions

METHODS AND APPARATUS FOR BLENDING IMAGES

BACKGROUND

Description of the Related Art

There are many photographic situations where the range of luminosity values spanning shadows and highlights in a scene is large and thus difficult to capture in a single exposure. For example, objects deep in a room, seen through a small window from outside, can be very dark compared to the outside wall of the house illuminated by direct sunlight. As another example, a single landscape photograph taken near dusk will tend to be either overexposed in the region of the sky to capture detail in the foreground or underexposed in the region of the foreground to capture detail of the sky. In such situations, photographers may capture two or more images of a scene, for example at different exposures (e.g., using different F-stops and/or shutter speeds) or using a flash or other light source to illuminate foreground objects in one image but not in other images. After capturing the two or more images of the scene, various regions from different ones of the two or more images may be combined into a blended image. Using the landscape photograph example, the better-exposed region of the foreground from one image may be merged with the better-exposed region of the sky from another image to produce a blended image that better captures detail throughout the scene.

In conventional, film-based photography, combining multiple negatives to produce a single print, for example captured at different exposures, requires complicated darkroom techniques. Digital photography technology and digital image processing technology have enabled the development of "digital darkroom" techniques via which multiple images may be merged without requiring the tedious darkroom processing of conventional photography. However, conventional digital image processing techniques for merging images tend to either require the user to manually generate several separate masks that each entirely cover one of the various regions in the multiple images, or are automated and thus do not give the user much if any control over the output.

Alpha Blending

In computer graphics, alpha blending, or alpha channel blending, refers to the use of an alpha channel with other channels in an image in order to show translucency. The alpha channel is an additional set of bits, for example eight bits in a 32-bit graphics system, used with each pixel that can represent multiple levels of translucency, for example 256 levels if eight bits are used. Generally, black and white are used to represent opaque and fully transparent, respectively, while various gray levels represent various levels of translucency between opaque and fully transparent. In a multilayered image, more than one layer may contain a translucent component; thus, multiple levels of blending may be required.

SUMMARY

Various embodiments of methods and apparatus for blending regions from multiple images to produce a blended image are described. Embodiments of a method for blending regions of multiple source images to produce a blended image may be implemented as or in an image blending module. In embodiments, two or more different digital images of a scene may be obtained. A background or base image is selected from among the two or more images. Another image is selected from among the two or more images as a current source image, and a stroke is applied to the current source image via a user interface to indicate a desired region of the source image which is to be blended with the base image; one stroke is used to indicate one region, and the stroke does not need to cover the entire region. A stroke may be applied to a source image, for example, via a brush provided by a user interface to the image blending module. The brush may, for example be manipulated by the user to draw the stroke via a cursor control device. A region in the source image is identified from the stroke, and the identified region is alpha blended with the corresponding region of the base image. Additional strokes may be applied to the current source image to select other regions of the current source image to be blended with the base image.

A different one of the two or more images may be selected as the current source image, and one or more regions from this source image may be selected for blending with the base image using one or more strokes, the corresponding regions identified, and the identified regions from this source image may then be alpha blended with the base image.

To identify a region in the source image from an input stroke applied to the source image, some embodiments may employ a graph cut algorithm in a segmentation technique. In some embodiments, pixel color values from pixels specified by the stroke may be used by the segmentation technique to locate a region around the stroke that includes similar pixels. As an alternative to, or in addition to, pixel color values, some embodiments may use other pixel values, for example hue or intensity values, in segmenting the image. In some embodiments, the pixel values of pixels specified by a stroke may be used in the segmentation technique to determine a range of pixel values used to identify pixels that are to be included in the region specified by the stroke. In some embodiments, one or more characteristics of the stroke applied by the user to the source image may be used to specify parameters used in the segmentation technique. For example, in some embodiments, a wider brush tip may result in a larger region than a narrower brush tip. As another example, in some embodiments, the length of the stroke may be used to specify one or more segmentation parameters.

Embodiments may use alpha blending to blend one or more regions selected from one or more source images with a base image. Embodiments may provide one or more blending level user interface elements via which a user may adjust the alpha blending level for a region overlaid on the base image from fully opaque to fully transparent. In some embodiments, layering may be used to blend stroke-specified regions of source images with a base image to produce a blended image. In layering, one or more layers may be added on top of a base image; modifications may be made in the one or more layers rather than to the base image, thus preserving the original base image. In some embodiments, in a multilayered image, one or more regions selected from a first source image may be applied to the base image in a first layer, and one or more regions selected from a second source image may be applied to the base image in a second layer. Regions from additional source images, if any, may be applied to the base image in additional layers. Thus, in a multilayered image, a blending level user interface element may be used to independently adjust the blending levels for region(s) from different source images applied to the base image in different layers. In some embodiments, the alpha blending level for all regions selected from one source image may be adjusted together via a blending level user interface element. In some embodiments, different regions from one source image may be applied to the base image in separate layers; in these embodiments, a blending level user interface element may be used to independently adjust the blending levels for different regions from the same source image if the different regions are applied to the base image in different layers.

Some embodiments of an image blending module may maintain a label map that maps each pixel in the blended base image to its corresponding source image. An image blending module may, for example, use this label map to determine all of the regions in the blended base image that are from the same source image. By determining all of the regions in the blended base image that are from a particular source image, the alpha blending level for all of these regions may be modified at one time by the user via an alpha blending level user interface element, even if regions from the same source image are in different layers in a layered image.

Some embodiments may provide a method and one or more user interface elements via which the user may select a single region from multiple source images and alpha blend the region from the source images with the selected base image to obtain the various details in the region captured in the different images. To accomplish this, some embodiment of an image blending module may maintain a label map in which each pixel in the blended image may be mapped to multiple source images using a vector that indicates all of the source images used to blend the respective pixel. An indication of each source image that is a source for the particular pixel in the blended image may be included in the source vector.

BRIEF DESCRIPTION OF THE DRAWINGS

FIGS. 5A through 5G illustrate a workflow that may be used to generate a blended image from the three images shown in FIGS. 4A through 4C according to some embodiments.

Figure 1A:
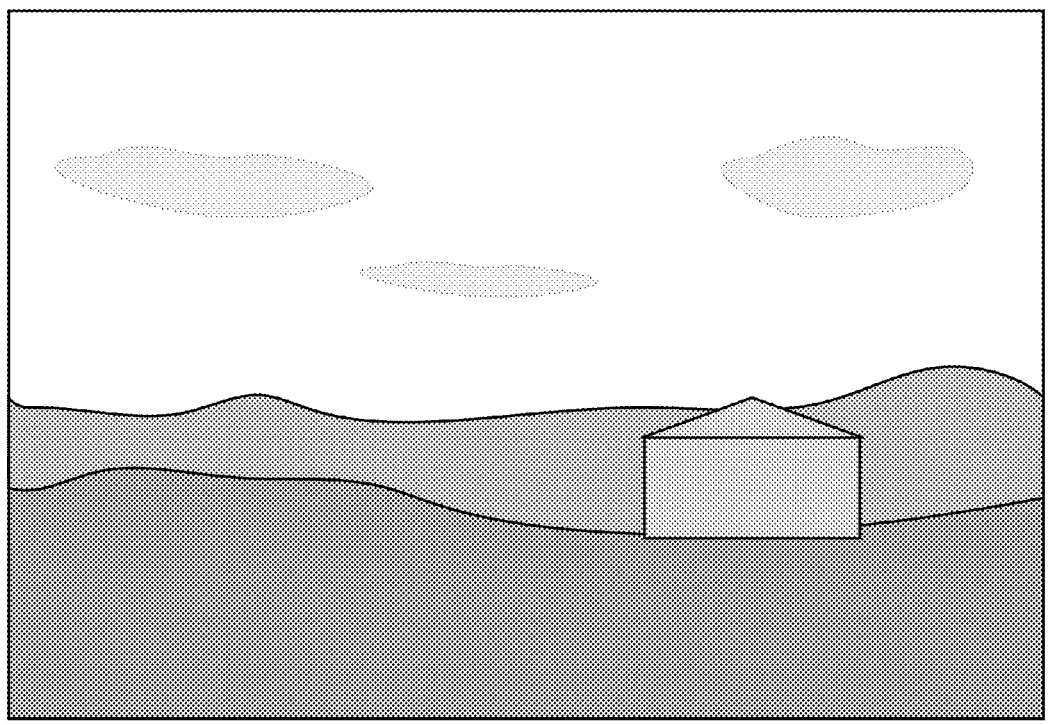
FIGS. 1A and 1B illustrate two synthesized images that represent two digital images of a landscape scene captured at different exposures.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 14:
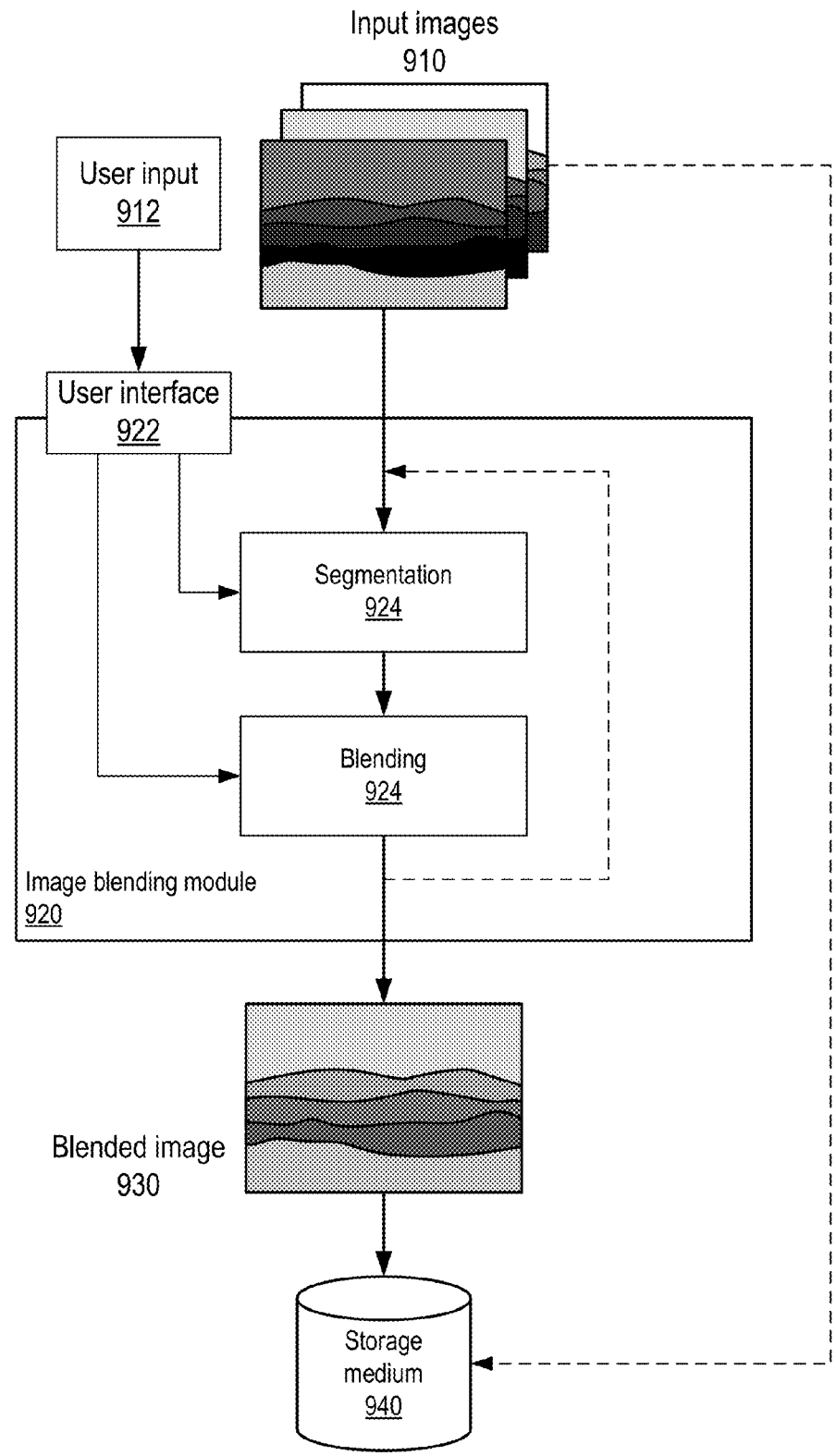
FIG. 14 illustrates an image blending module that may implement image blending methods and workflows, according to some embodiments.
Figure 15:
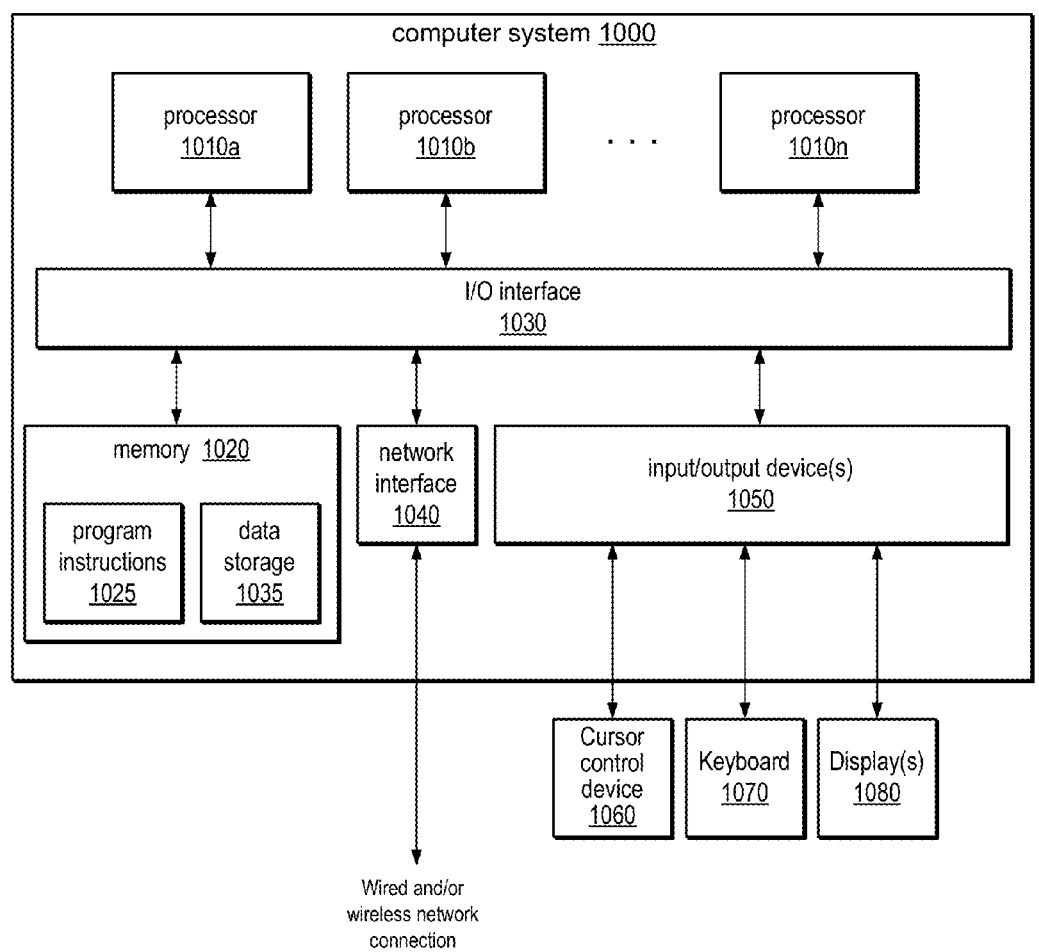
FIG. 15 illustrates an example computer system that may be used in embodiments.

Various embodiments of methods and apparatus for blending regions of multiple images to produce a blended image are described. Embodiments of a method for blending regions of multiple source images to produce a blended image as described herein may be implemented as or in an image blending module. Embodiments of the image blending module may, for example, be implemented as a stand-alone image processing application, as a module of an image processing application, as a plug-in for applications including image processing applications, and/or as a library function or functions that may be called by other applications. Embodiments of the image blending module may be implemented in any image processing application, including but not limited to Adobe® PhotoShop® Adobe® PhotoShop® Elements®, and Adobe® After Effects®. An example image blending module is illustrated in FIG. 14. An example system on which an image blending module may be implemented is illustrated in FIG. 15.

Figure 1B:
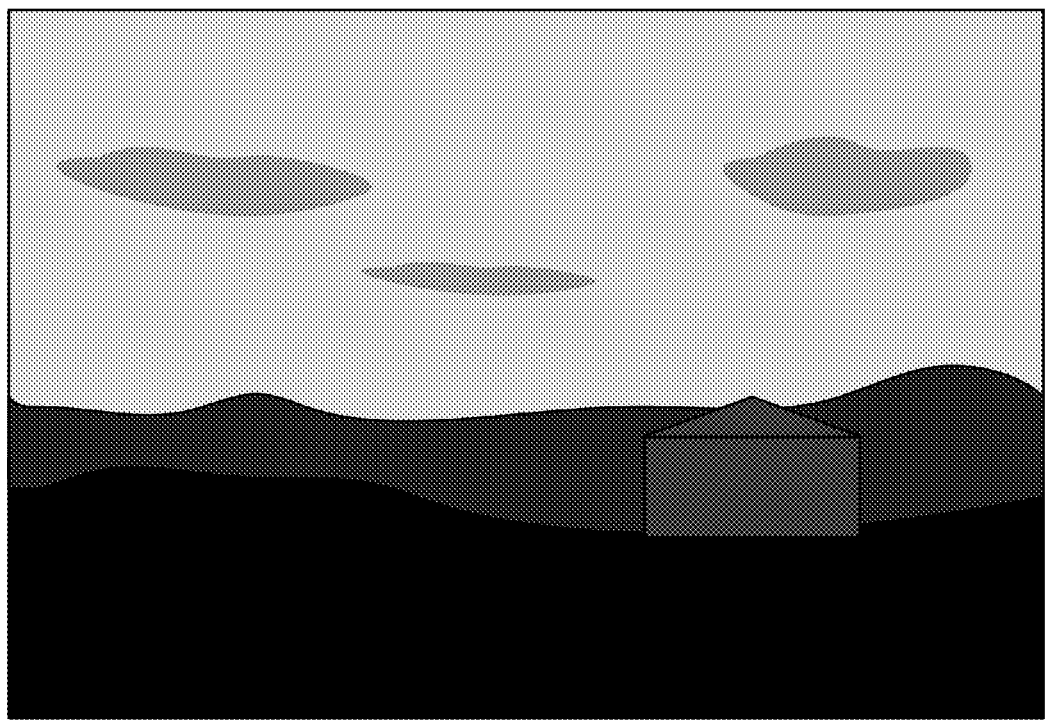

In embodiments of a method for blending regions of multiple source images to produce a blended image, two or more different digital images of a scene may be obtained. For example multiple images may be captured at different exposures to better capture detail of different regions of the scene according to the lighting of the regions. The digital images may be color images or grayscale ("black and white") images. The digital images may be digitally-captured images such as digital photographs, digitized images such as digitized conventional photographs or negatives, digital video frames, or in general any digital images. FIGS. 1A and 1B illustrate two synthesized images that represent two digital images of a landscape scene captured at different exposures. FIG. 1A simulates an image that was taken at a longer exposure so that details of the foreground are well illuminated; however, the sky is overexposed. FIG. 1B simulates a second image that was taken of the same scene at a shorter exposure so that the sky is better exposed to capture more detail; however, the foreground is underexposed.

Figure 2A:
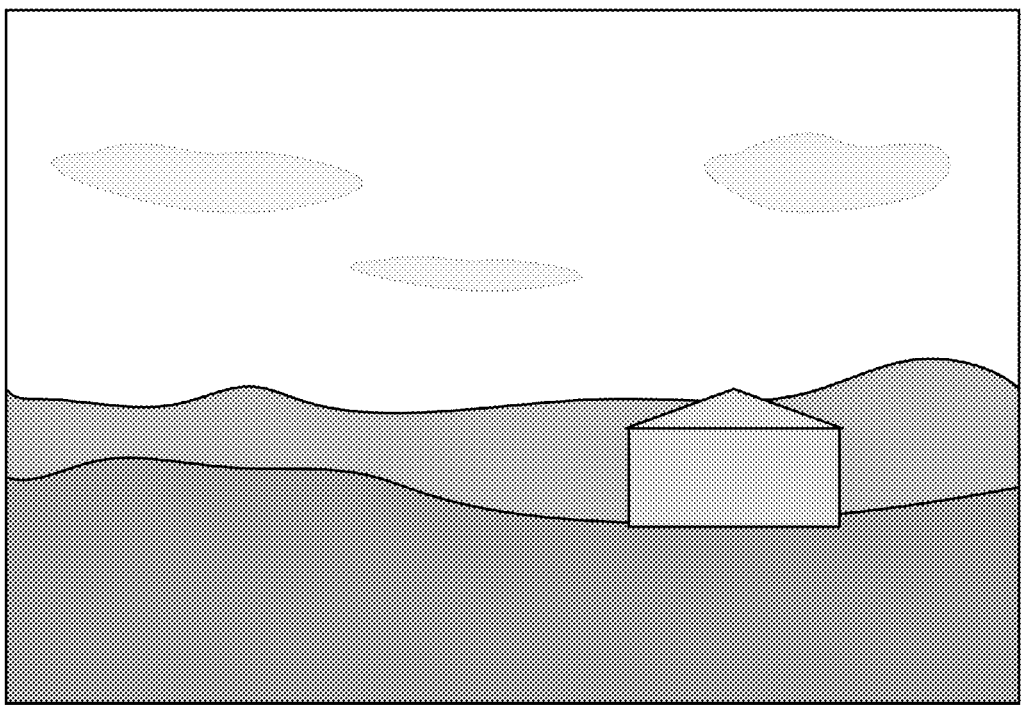
FIGS. 2A through 2C illustrate a workflow for selecting a region from the image shown in FIG. 1B and applying the region to the image shown in FIG. 1A to produce a blended image, according to some embodiments.
Figure 2B:
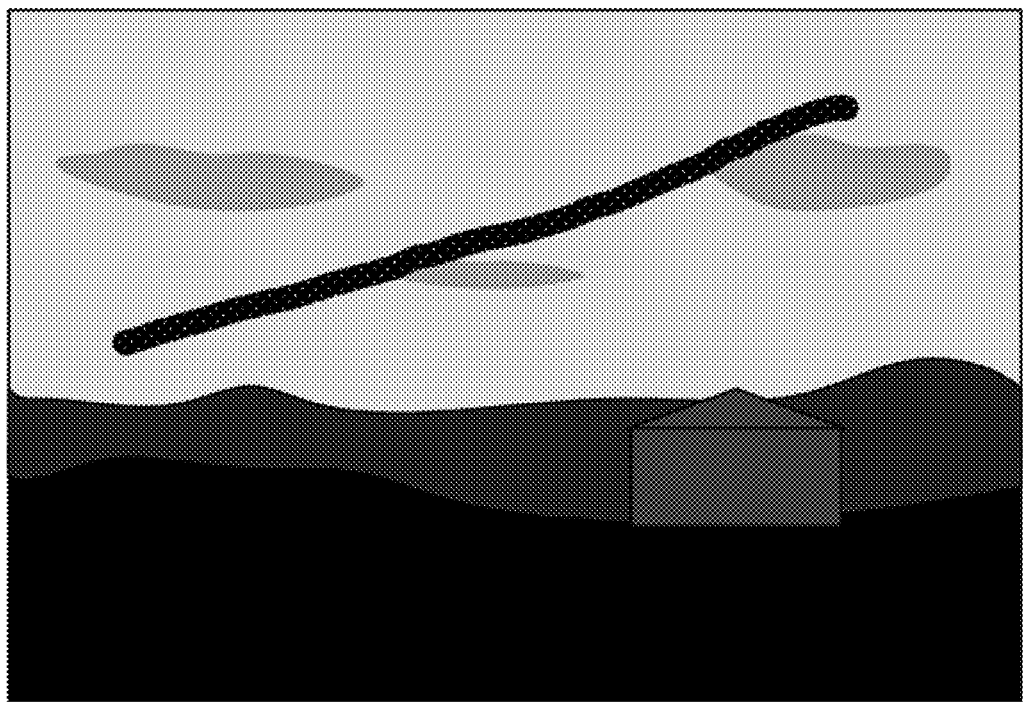

FIGS. 2A through 2D illustrate a workflow for selecting a region from the image shown in FIG. 1B and applying the region to the image shown in FIG. 1A to produce a blended image, according to some embodiments. In embodiments, a background or base image is selected from among the two or more images. FIG. 2A shows the image shown in FIG. 1A selected as the base image. Another image is selected as a source image, and one or more strokes are applied to the source image via a user interface to specify region(s) of the source image which are to be blended with the base image; one stroke is used to specify one region, and the stroke does not need to cover the entire region. FIG. 2B shows the image shown in FIG. 1B selected as a source image. The broad black dotted line across the sky region of the image in FIG. 2B represents a stroke applied by the user to the sky region of the source image. The stroke may be applied to the source image, for example, via a brush provided by a user interface to the image blending module. The brush may be manipulated by the user to draw the stroke via a cursor control device such as a mouse, trackball, touchpad, or keyboard. Other methods of applying a brush stroke may be used. For example, a stylus, finger, or other implement may be used to draw the stroke on the touch-sensitive surface of a touch-enabled input device, such as a touchpad, tablet, or touch-sensitive screen.

Figure 2C:
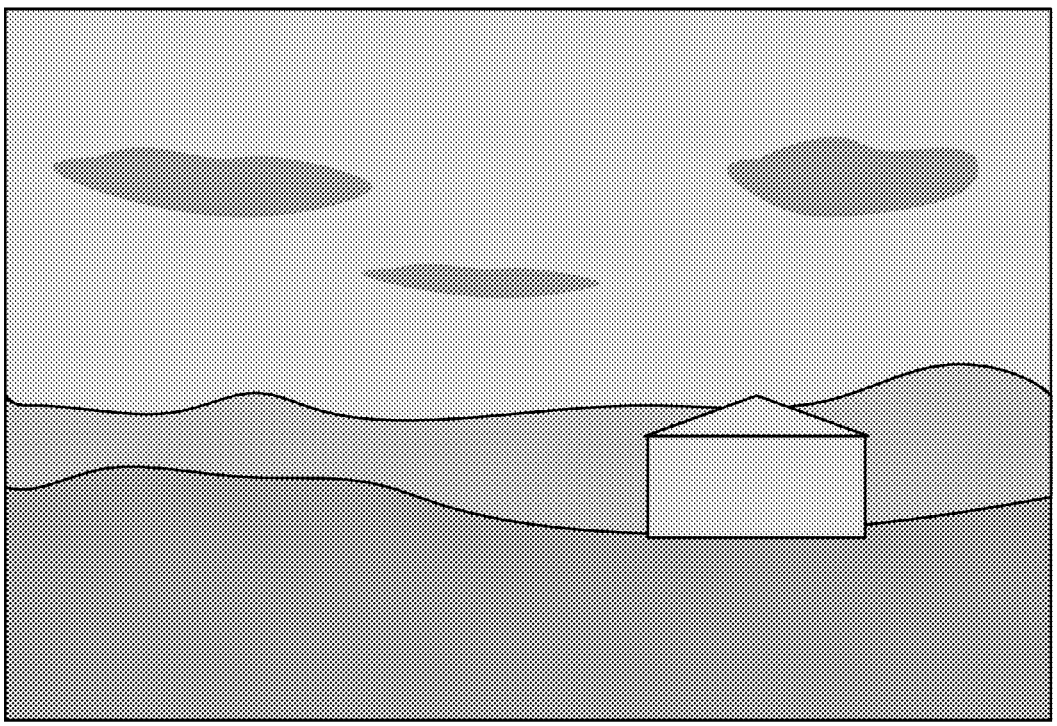

FIG. 2C shows the sky region of FIG. 2B, selected by the user in FIG. 2B using a single stroke, blended with the base image shown in FIG. 2A to produce a blended image that is better-exposed across the entire image than any single one of the source images.

To identify a region in the source image from an input stroke applied to the source image, some embodiments may employ any one of several image processing algorithms, known collectively as graph cut algorithms, in a segmentation technique to segment the source image into two regions (the region specified by the stroke is one region, and the rest of the image is the other region). However, other types of image processing algorithms than graph cut algorithms may be used in a segmentation technique in other embodiments to locate region(s) in the source image. In some embodiments, pixel color values from pixels specified by a stroke may be obtained and used by the segmentation technique to segment an image into two regions. As an alternative to, or in addition to, pixel color values, some embodiments may use other pixel values, for example hue or intensity values, in segmenting the image. Some embodiments may provide one or more user interface elements via which the user may specify what pixel values or range of pixel values are to be used to segment an image. Some embodiments may provide one or more user interface elements via which the user may adjust one or more segmentation parameters, such as thresholds to be used when segmenting an image.

In some embodiments, one or more characteristics of the stroke applied by the user to the source image may be used to specify parameters used in the segmentation technique. For example, in some embodiments, the width of the brush tip used to draw the stroke may be used to specify one or more segmentation parameters. In some embodiments, for example, a wider brush tip may specify that a wider range of pixel values is to be used in identifying pixels to be included in the region, while a narrower brush tip may specify a narrower range; thus, a wider brush tip may result in a larger region than a narrower brush tip. Some embodiments may provide one or more user interface elements via which the user may set or change the width of the brush tip to be used when drawing a stroke. As another example, in some embodiments, the length of the stroke may be used to specify one or more segmentation parameters. In some embodiments, the width of the brush tip and the length of the stroke may both be used to specify one or more segmentation parameters. Other characteristics of the stroke, for example stroke speed and/or direction, or even the color used for the stroke, may be used specify one or more segmentation parameters in some embodiments.

Figure 2D:
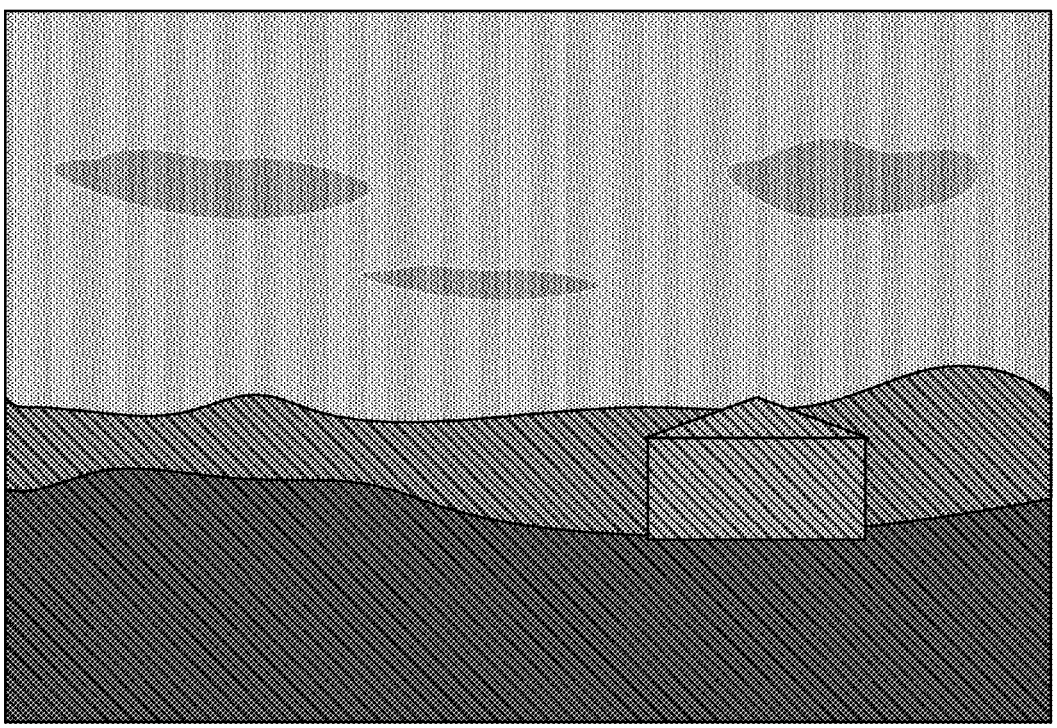
FIG. 2D illustrates two regions of the blended image shown in FIG. 2C, according to some embodiments.

In some embodiments, the pixel values of pixels defined by a stroke may be used to determine a range of pixel values used to identify pixels that are to be included in the region specified by the stroke. In some embodiments, the identified region is contiguous; that is, the segmentation technique searches out from the stroke, and does not cross any boundaries to identify other separate areas of the image that may satisfy the pixel value criteria identified from the stroke. FIG. 2D illustrates two regions of the blended image shown in FIG. 2C: the sky region, indicated by a dotted texture, which was selected by the single stroke shown in FIG. 2B and located by the segmentation technique from the stroke; and the rest of the image, in this example the foreground from the base image shown in FIG. 2A, indicated by diagonal lines. Some embodiments may provide one or more user interface elements via which a user may optionally view a visual indication of the various regions in a blended image, for example by shading, outlining, or texturing the regions, with different regions shaded, outlined, or textured differently to indicate that the regions are sourced from different images.

In some embodiments, a digital image processing technique referred to as layering may be used to blend stroke-specified regions of source images with a base image to produce a blended image such as the example blended image shown in FIG. 2C. In layering, one or more layers may be added on top of a base image; modifications may be made in the one or more layers rather than to the base image, thus preserving the original base image. For example, to blend a region of a source image with the base image, pixel values from the region may be applied in a separate layer on top of the base image. Layering thus preserves the base image; the pixels of a selected region are not applied directly to the pixels of the base image. Using layering simplifies operations such as "undo" operations, modifications of applied regions such as adding to or erasing parts of applied regions, and blending adjustments.

Alpha blending refers to the use of an alpha channel with other channels in an image in order to show translucency. Embodiments may use alpha blending to blend one or more regions selected from one or more source images with a base image. Embodiments may provide one or more blending level user interface elements via which a user may adjust the alpha blending level (e.g., from 0% (opaque) to 100% (fully transparent)) used for a region or regions overlaid on the base image. A blending level user interface element may, for example, be implemented as a slider bar, a text entry box, a dial, a menu, or in general any type of control user interface element that may be used to select from a specified range.

In some embodiments, in a multilayered image, one or more regions selected from a first source image may be applied to the base image in a first layer, and one or more regions selected from a second source image may be applied to the base image in a second layer. Regions from additional source images, if any, may be applied to the base image in additional layers. Thus, in a multilayered image, a blending level user interface element may be used to independently adjust the blending levels for region(s) from different source images applied to the base image in different layers. In some embodiments, the alpha blending level for all regions selected from one source image may be adjusted together via a blending level user interface element. In some embodiments, different regions from one source image may be applied to the base image in separate layers; in these embodiments, a blending level user interface element may be used to independently adjust the blending levels for different regions from the same source image if the different regions are applied to the base image in different layers.

Figure 3A:
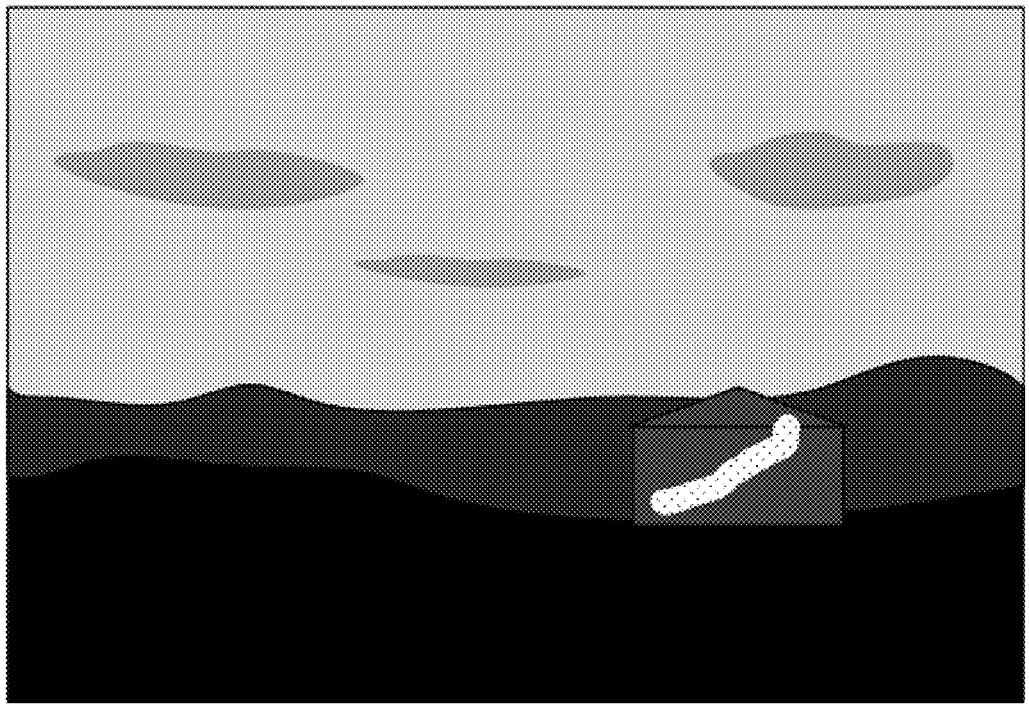
FIGS. 3A and 3B illustrate the selection of another region from the source image shown in FIG. 1B and applying the selected region to the blended image shown in FIG. 2C, according to some embodiments.
Figure 3B:
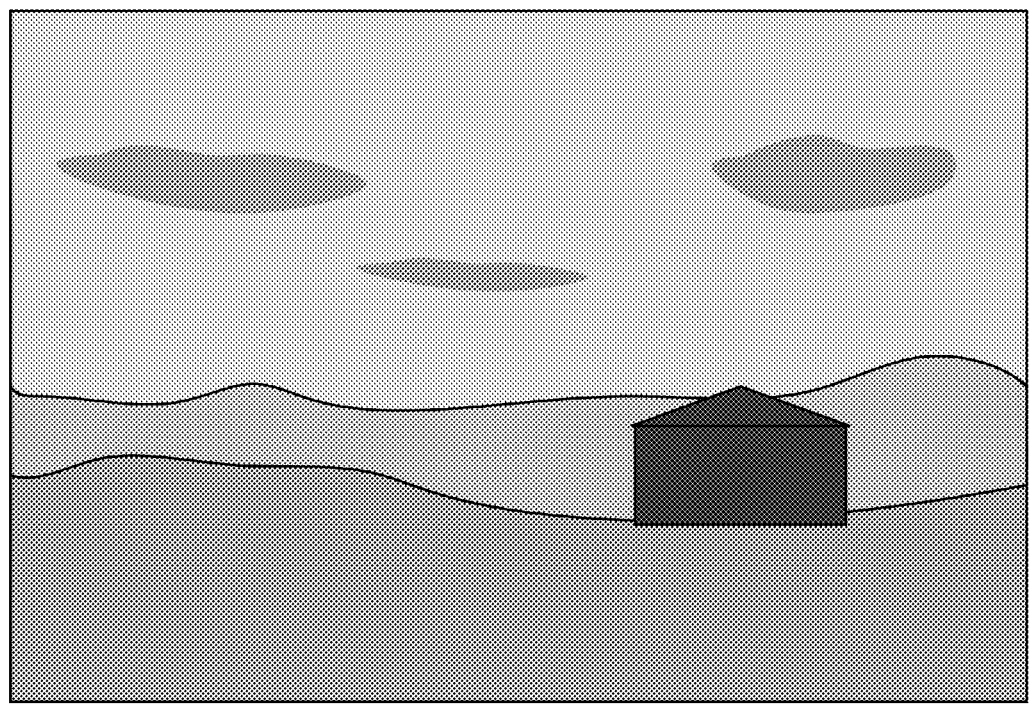
Figure 3C:
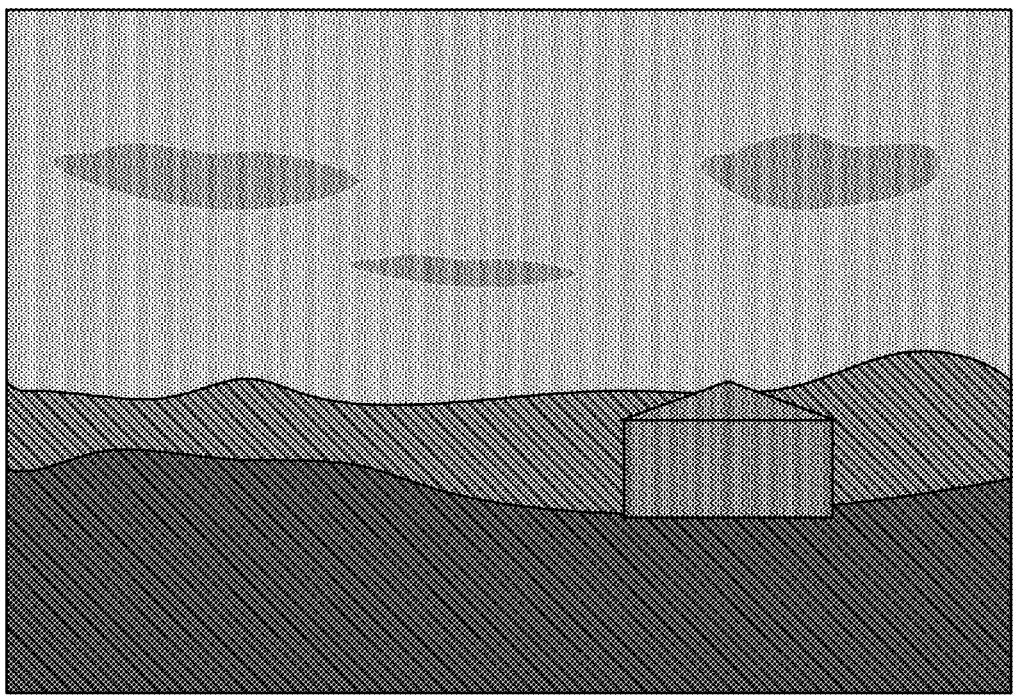
FIG. 3C illustrates the regions of the blended image shown in FIG. 3B which include a region from the image shown in FIG. 1B, selected by strokes shown in FIGS. 2B and 3A, and a region from the base image shown in FIG. 1A, according to some embodiments.

While FIGS. 2A through 2C illustrate the selection of one region of a source image to be applied to a base image to produce a blended image as shown in FIG. 2C, embodiments may allow a user to select one or more additional regions from a source image to be blended with the base image. FIGS. 3A through 3C illustrate the selection of another region from the source image shown in FIGS. 1B and 2B and applying the selected region to the blended image shown in FIG. 2C, according to some embodiments. For example, the user may prefer the appearance of the house in the image shown in FIG. 1B to the appearance of the house in the image shown in FIG. 1A, which was used as the base image. In FIG. 3A, the user has applied a stroke to the source image to select the "house" in the image as another region to be applied to the base image. The broad white dotted line across the house represents the stroke applied by the user to the source image. FIG. 3B shows that the region selected in FIG. 3A has been blended, along with the region selected as indicated in 2B, with the base image to produce a blended image that is differently exposed across different regions according to the preferences of the user. FIG. 3C illustrates the regions of the image shown in FIG. 3B: the region from the image shown in FIG. 1B, selected by strokes shown in FIGS. 2B and 3A, indicated by a dotted texture; and the rest of the image, in this example the foreground from the image shown in FIG. 1A, indicated by diagonal lines.

Some embodiments of an image blending module may maintain a label map that maps each pixel in the blended base image to its corresponding source image. The image blending module may, for example, use this label map to determine all of the regions in the blended base image that are from the same source image. This blended image region information may be used, for example, to display an indication of regions from a source image in the blended image, as shown in FIG. 3C. The blended image region information may also be used in setting alpha blending levels. By determining all of the regions in the blended base image that are from a particular source image, the alpha blending level for all of these regions may be modified at one time by the user via an alpha blending level user interface element, even if regions from the same source image are in different layers in a layered image.

While FIGS. 2A through 2D and FIGS. 3A through 3C illustrate the selection of one or more regions from a single source image to be applied to a base image to produce a blended image, some embodiments may allow regions selected from multiple source images to be blended into a base image to produce a blended image. FIGS. 4A through 4C and FIGS. 5A through 5G illustrate the selection of regions from multiple source images and blending the selected regions into a base image to produce a blended image, according to some embodiments. While FIGS. 4A through 4C and FIGS. 5A through 5G show three images with two source images and one base image, embodiments may be applied to sets of more than three images, and content from more than two source images may be blended with a base image using embodiments.

Figure 4A:
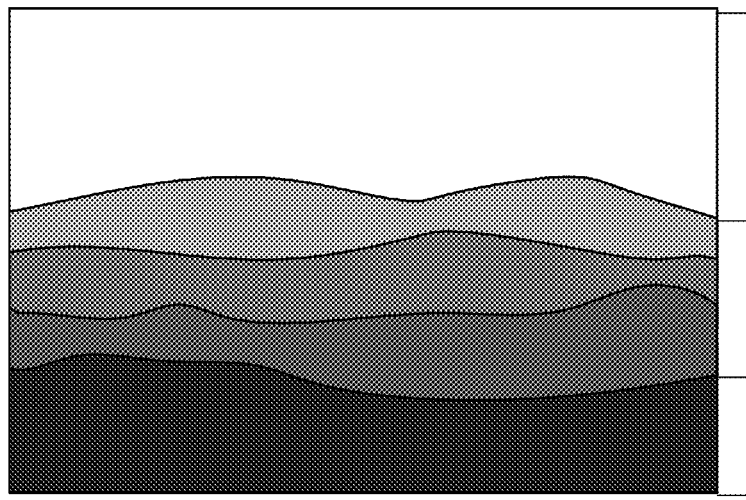
FIGS. 4A through 4C illustrate three synthesized images that represent three digital images of a landscape scene captured at three different exposures.
Figure 4B:
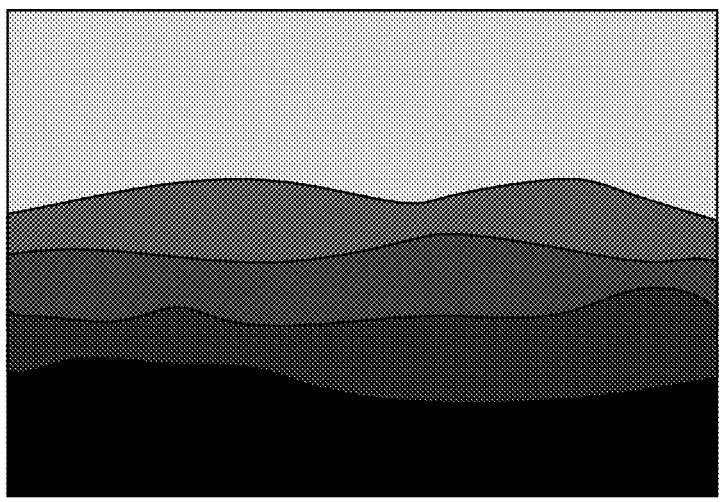
Figure 4C:
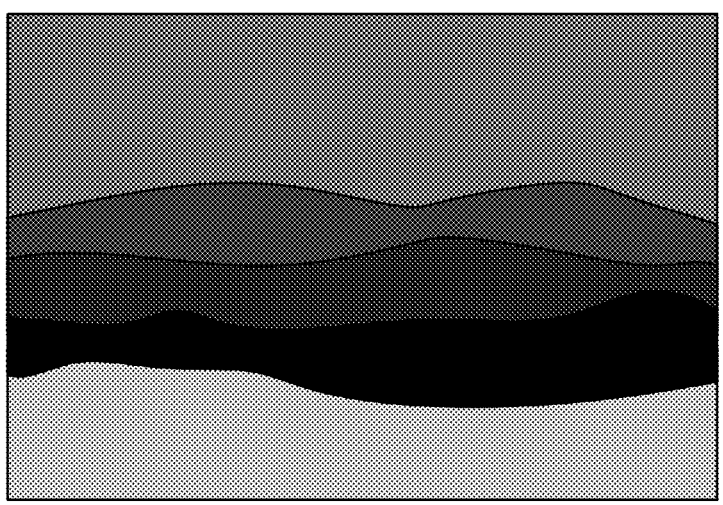

FIGS. 4A through 4C illustrate three synthesized images that represent three digital images of a landscape scene captured at three different exposures. FIG. 4A simulates an image that was taken at a longer exposure so that details of the midrange region are well exposed; however, the sky is overexposed, and the foreground is slightly underexposed due to the foreground lighting. FIG. 4B simulates a second image that was taken of the same scene at a shorter exposure than that used for FIG. 4A so that the sky is better exposed to capture more detail; however, the midrange and foreground are underexposed. FIG. 4C simulates a third image that was taken of the same scene using artificial lighting, for example a flash, at an even shorter exposure so that the foreground is better exposed; however, the midrange and sky are underexposed.

FIGS. 5A through 5G illustrate a workflow that may be used to generate a blended image from the three images shown in FIGS. 4A through 4C according to some embodiments. The workflow may be performed via a user interface to an image blending module that implements a method for blending regions of multiple source images to produce a blended image as described herein. An example user interface to an image blending module is illustrated in FIGS. 9A through 9G.

In FIG. 5A, the user selects one of the images to use as a base image 502. In this example, the image from FIG. 4A has been selected as the base image 502. The other two images may be used as source images 500. In this example, the image from FIG. 4B is shown as source image 500A, and the image from FIG. 4C is shown as source image 500B. In FIG. 5B, the user has applied a stroke to the sky region of source image 500A via the user interface to select the sky region of the source image 500A for blending with the base image. The broad white dotted line across the sky represents the stroke applied by the user to the source image 500A. The image blending module applies a segmentation technique that uses the selection stroke of FIG. 5B to determine all pixels in source image 500A that are to be included in the region. The diagonal lines in FIG. 5C indicate the region thus determined by the segmentation technique. In FIG. 5D, the region of source image 500A determined by the segmentation technique from the stroke has been overlaid onto base image 502 to produce blended image 504.

Figure 5E:
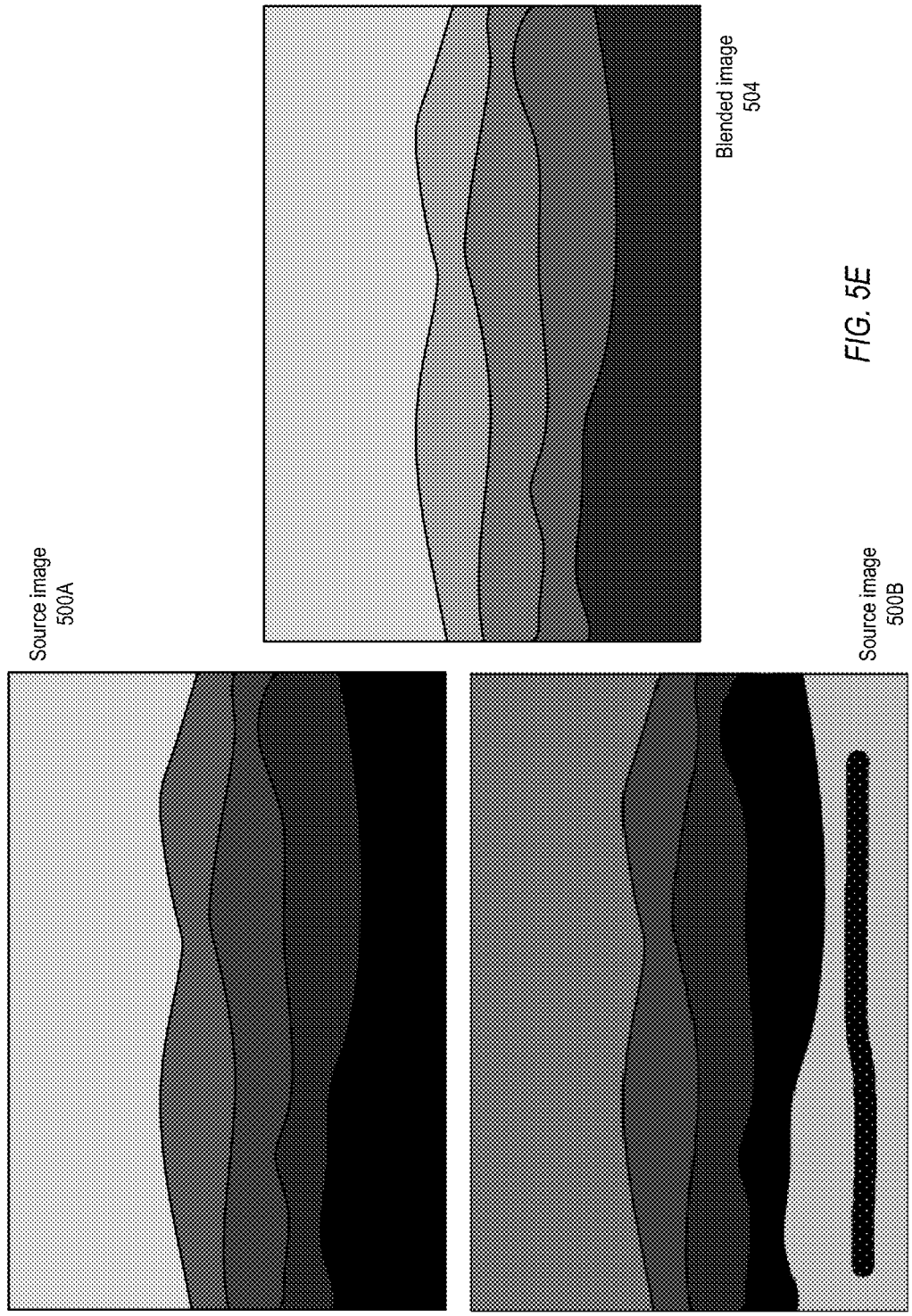
Figure 5G:
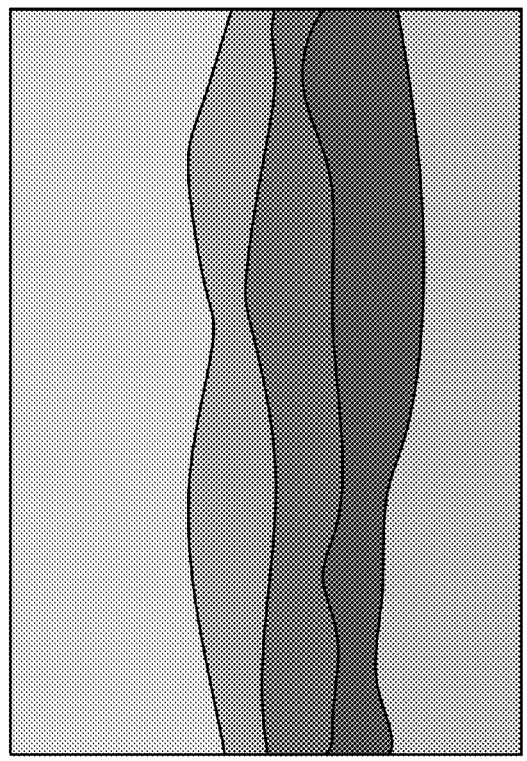
Figure 5G:
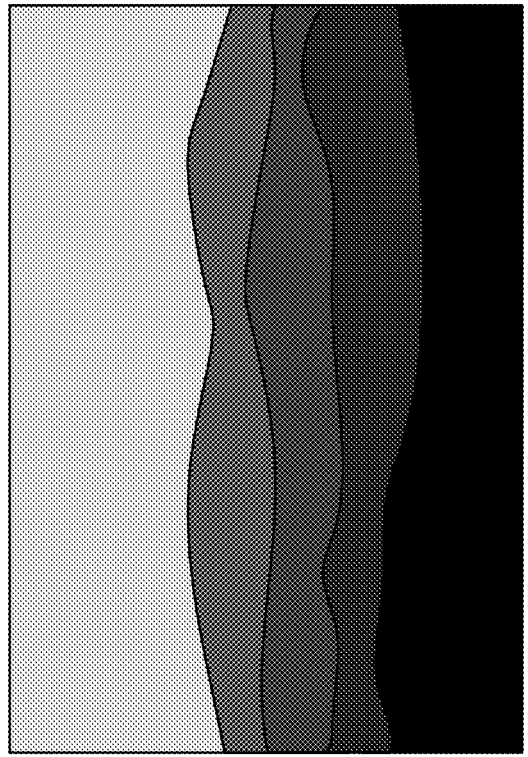
Figure 5G:
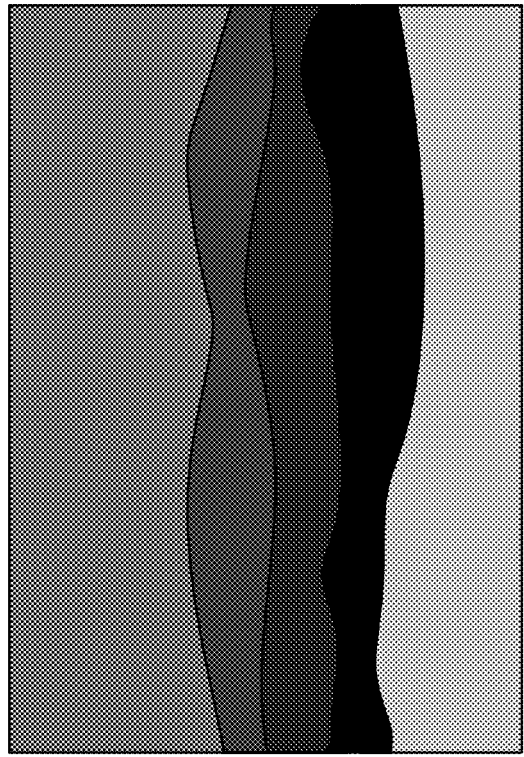

In FIG. 5E, the user has applied a stroke to the foreground region of source image 500B via the user interface. The broad black dotted line across the foreground represents the stroke applied by the user to the source image 500B. The image blending module applies the segmentation technique which uses the selection stroke of FIG. 5E to determine all pixels in source image 500B that are to be included in the region. The diagonal lines in FIG. 5F indicate the region thus determined by the segmentation technique. In FIG. 5G, the foreground region of source image 500B has been overlaid onto blended image 504 to produce blended image 506.

While not shown in FIGS. 5A through 5G, after a region is selected from a source image and blended with the base image, there may be areas that are either blended into or not blended into in the base image that the user desires to fix or touch up. For example, some small areas around the border of a selected region may be missed by the segmentation technique. In some embodiments, to fix such a missed area, a thinner stroke may be applied to the source image to select the region, and the selected region may be blended with the base image. See FIG. 10C for an example. In addition to missed areas, a thicker stroke may cause some areas of the source image to be blended with the base image that the user does not want to be blended. In some embodiments, such undesired areas in the blended base image may be removed by selecting the original base image as the current source image and applying a stroke to reselect the region from the original base image. The selected region from the original base image may then be blended with the blended base image. See FIGS. 10C and 10D for an example. Some embodiments may provide other methods and tools via which the user may make desired corrections to a blended base image.

Figure 6:
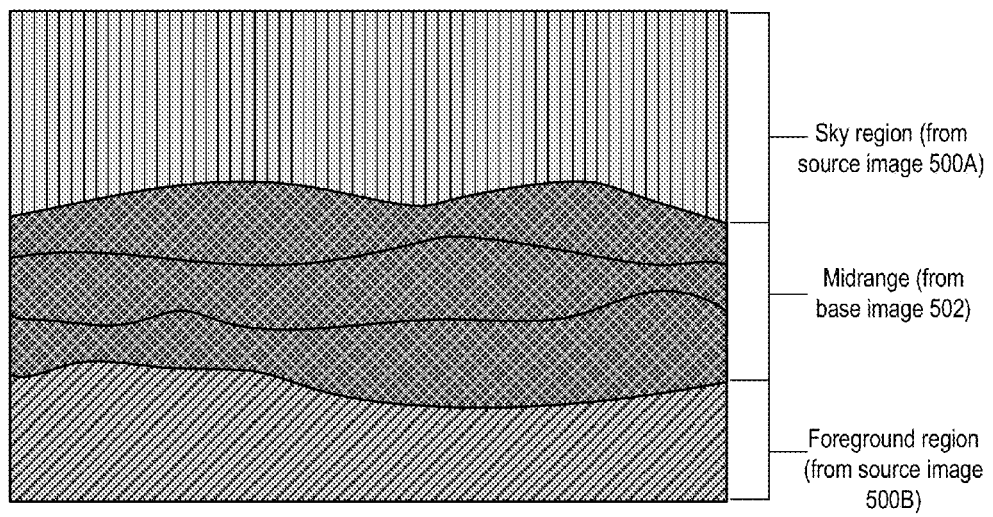
FIG. 6 illustrates the regions of multiple source images that are blended with a base image to produce a blended image, according to some embodiments.

FIG. 6 illustrates the regions of source images 500A and 500B that are blended with base image 502 to produce blended image 506 shown in FIG. 5G. The sky region from source image 500A is indicated by vertical lines. The foreground region from source image 500B is indicated by diagonal lines. The rest of the image, in this example the midrange region from base image 502, is indicated by crosshatched lines. Some embodiments may provide one or more user interface elements via which a user may optionally view a visual indication of the various regions in a blended image, for example by shading, outlining, or texturing the regions, with different regions shaded, outlined, or textured differently.

Figure 7:
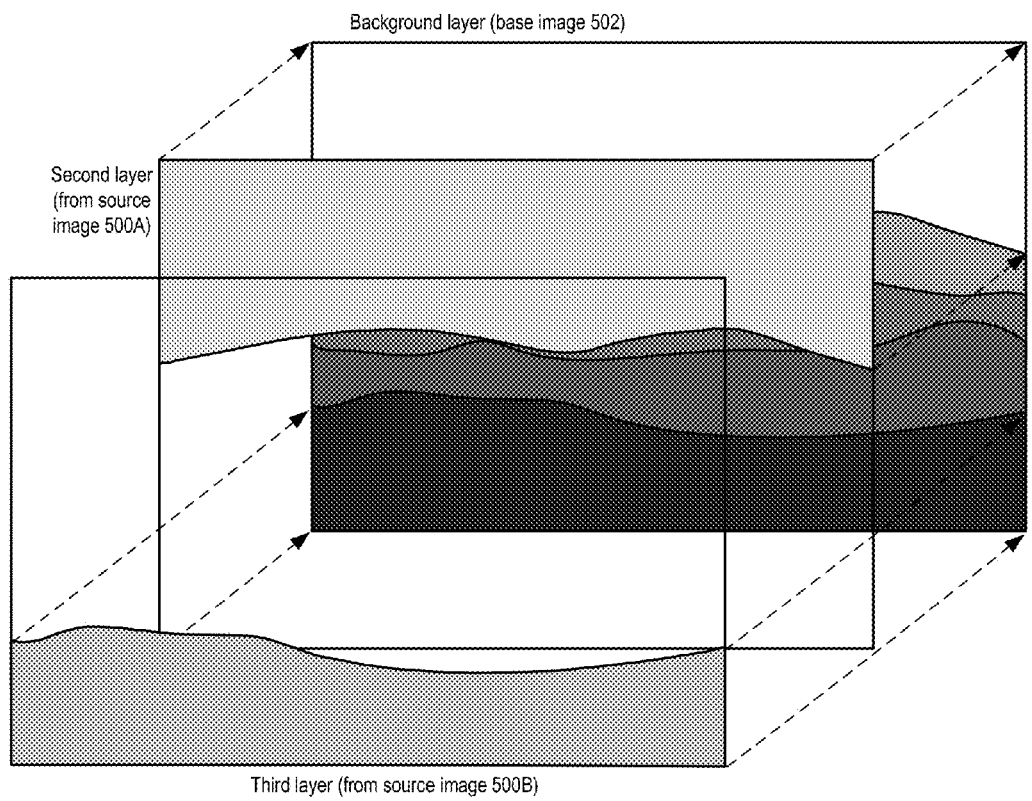
FIG. 7 illustrates using layers to compose a blended image according to some embodiments.

FIG. 7 illustrates using layers to compose a blended image according to some embodiments. Base image 502 is used as a background layer. A second layer includes the sky region from source image 500A. The rest of the second layer is fully transparent so that portions of the background layer that are not behind the sky region are displayed. A third layer includes the foreground region from source image 500B. The rest of the third layer is fully transparent so that portions of the layers underneath the third layer that are not behind the foreground region are displayed (if not covered by portions of layers underneath the third layer). Note that the regions in the second and third layer in this Figure are shown with the alpha blending set to opaque (0%); the pixels in these regions will completely cover or "paint over" corresponding pixels of underlying layers.

Figure 8:
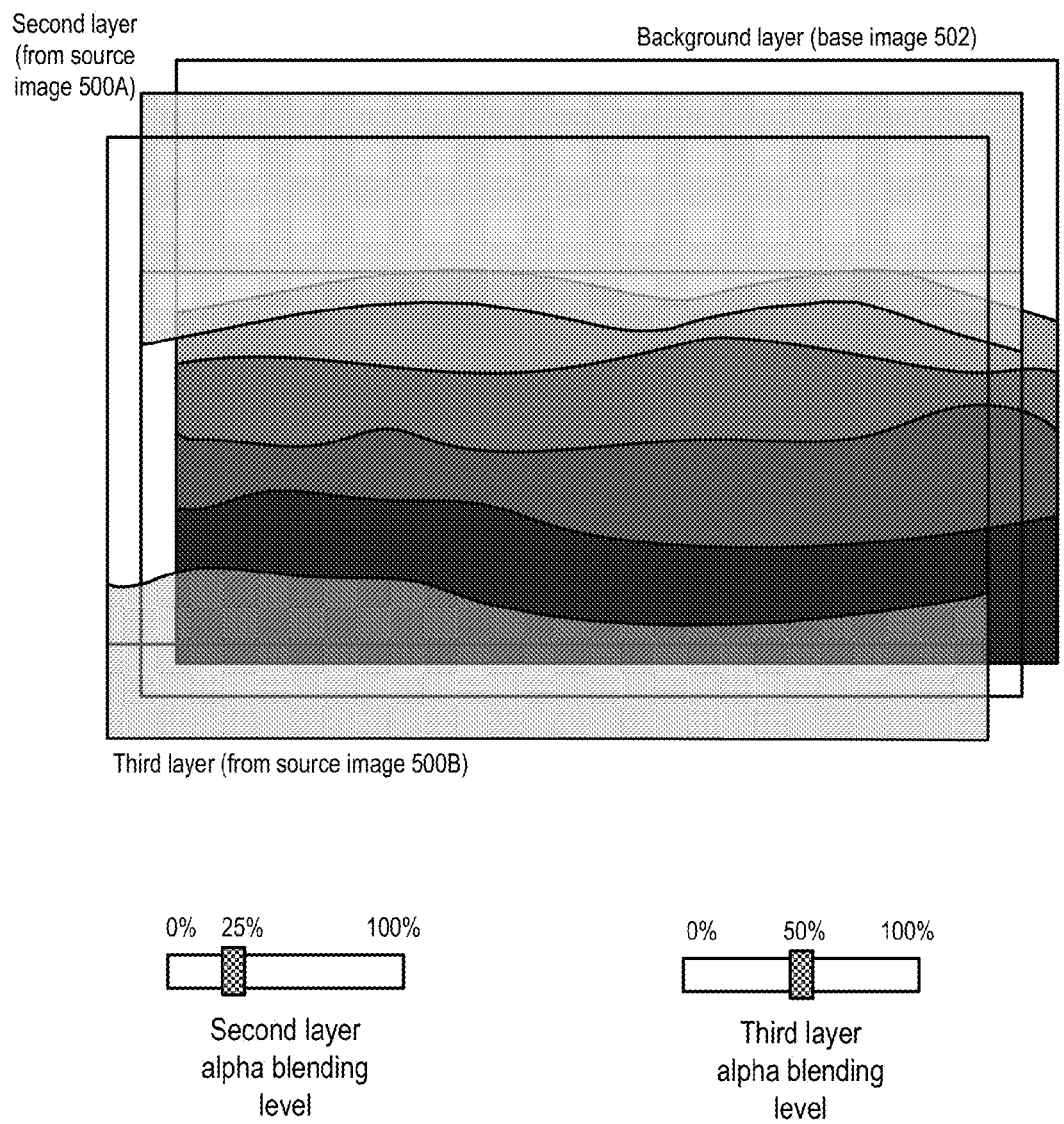
FIG. 8 illustrates adjusting the alpha blending levels of layers in a blended image according to some embodiments.

FIG. 8 illustrates adjusting the alpha blending levels of layers in a blended image according to some embodiments. Embodiments may use alpha blending to blend one or more regions selected from one or more source images with a base image. Embodiments may provide one or more blending level user interface elements via which a user may adjust the alpha blending level (e.g., from 0% (opaque) to 100% (fully transparent)) used for layers overlaid on the base image. A blending level user interface element may, for example, be implemented as a slider bar, a text entry box, a dial, a menu, or in general any type of user interface element that may be used to select from a range. FIG. 8 shows slider bars used as blending level user interface elements. In FIG. 8, the alpha blending level for the second layer is set to 25% so that the second layer is partially translucent, and the alpha blending level for the third layer is set to 50%, so that the translucency of the third layer is 50%.

While FIG. 8 shows two separate user interface elements that may be used to independently adjust the alpha blending levels for different regions, some embodiments may provide one or more user interface elements via which a user may adjust the alpha blending levels for all regions.

Furthermore, while FIGS. 2A through 8 show different, non-overlapping regions selected from source images, different, but overlapping, regions may be selected from the same source image or from different source images. In addition, in some embodiments, the same region may be selected from two or more source images. See, for example, FIG. 12.

Example User Interface

FIGS. 9A through 9G illustrate an example user interface to a image blending module that may be used to perform image blending workflows as described herein, according to some embodiments. The user interface is provided as an example, and is not intended to be limiting.

Figure 9A:
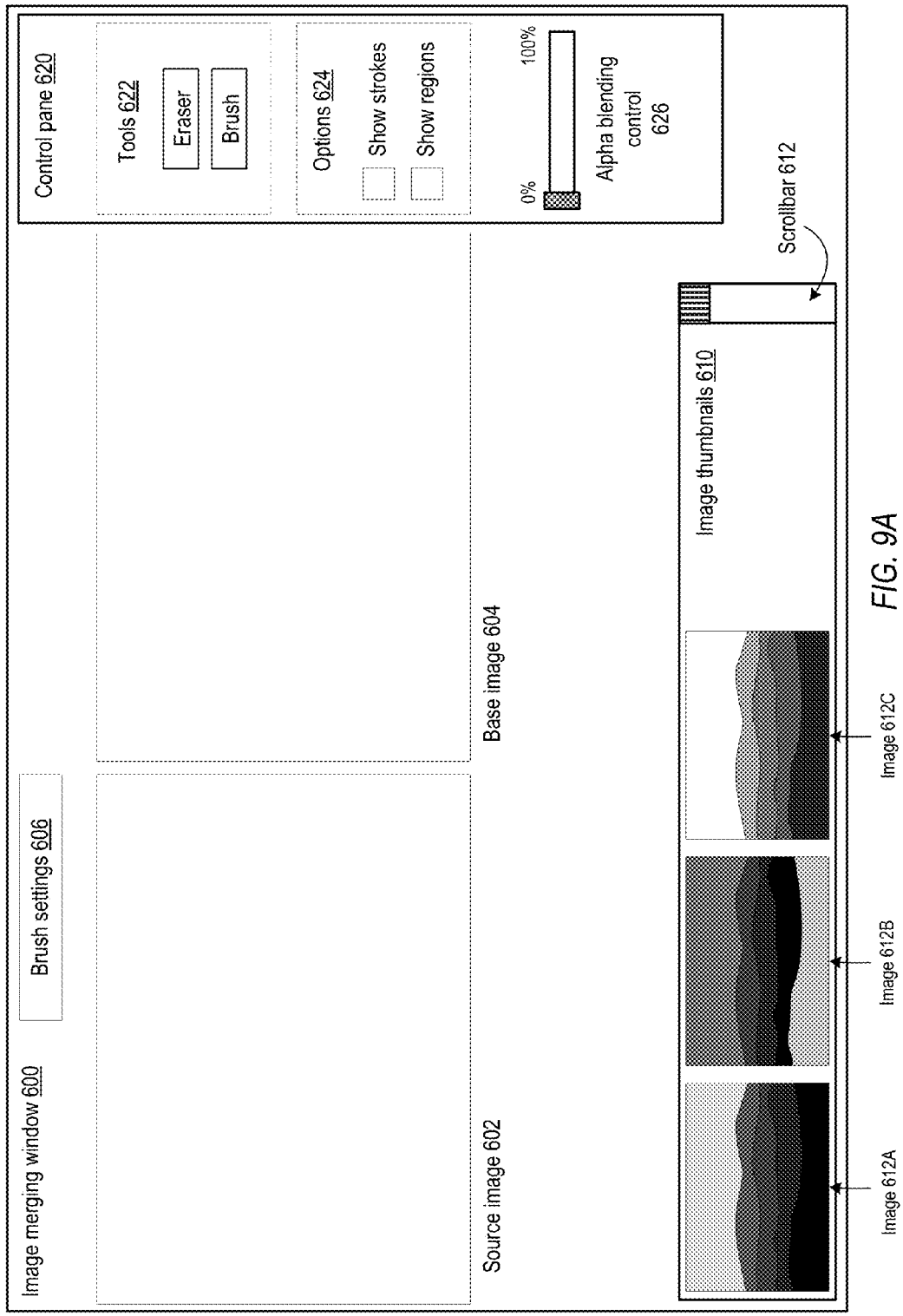
FIGS. 9A through 9G illustrate an example user interface to a image blending module that may be used to perform image blending workflows as described herein, according to some embodiments.

FIG. 9A shows an image merging window according to some embodiments. Image merging window 600 may include an image thumbnails area 610 and a control pane 620. Image merging window 600 may also include two panes where selected images may be displayed. One pane may be a base image pane 604 where an image selected as a base or background image may be displayed. The other pane may be a source image pane 602 where a selected source image may be displayed. Window 600 may include one or more other user interface elements, such as a brush settings 606 user interface element via which the user may specify one or more settings, such as width, for a brush tool to be used to paint strokes on source images to select regions.

The image thumbnails 610 user interface element may be used to display thumbnails of a set of images that the user has selected to work on. In this example, image thumbnails 610 shows, from left to right, thumbnails for the images from FIGS. 4B, 4C, and 4A, respectively, selected as a set of images to be worked on. In this example, the images from FIGS. 4B, 4C, and 4A are labeled as images 612A, 612B, and 612C, respectively. While this example shows three images in the set, two, three or more images may be included in a set of images to be blended according to the methods described herein. The image thumbnails 610 user interface element may include a scrollbar 612 via which the user may scroll to see additional thumbnails if all thumbnails for a selected set of images cannot be displayed at one time in the image thumbnails 610 user interface element. While not shown in the example interface, embodiments may provide one or more user interface elements via which a user may select sets of images to be displayed in image thumbnails 610. Thumbnails displayed in image thumbnails 610 may be selected for the image panes 602 and 604 described above. Selecting a thumbnail for an image pane causes the corresponding image to be displayed in the respective image pane. User interface methods for selecting a thumbnail to be displayed in either source image pane 602 or base image pane 604 are described below.

Example control pane 620 may include one or more user interface elements via which the user may perform various aspects of an image blending workflow as described herein. In this example, control pane 620 includes tools 622, options 624, and an alpha blending control 626 that may be used to adjust alpha blending levels. While FIGS. 9A through 9G show alpha blending control 626 set to 0% (fully opaque) so that regions from the source images applied to the base image completely cover the similar regions in the base image, alpha blending control 626 may be manipulated by the user when performing the workflow operations as described for FIGS. 9A through 9G to adjust the alpha blending level for a region or regions in the range from 0% (fully opaque) to 100% (fully transparent) as described in regards to FIG. 8. Also, while FIGS. 9A through 9G show alpha blending control 626 as a slider bar, other types of controls may be used instead of or in addition to a slider bar to adjust the alpha blending level. Furthermore, some embodiments may not provide alpha blending adjustment and thus may not provide an alpha blending control 626.

In the example control pane 620, tools 622 includes a brush tool that may be selected by the user to draw a stroke or strokes on a selected source image according to the current settings of the brush that the user has specified via brush settings 606. Tools 622 also includes an eraser tool that may be selected by the user to, for example, erase portions of regions from source images overlaid on the base image. Some embodiments may provide one or more user interface elements via which the user may control settings of the eraser tool. In some embodiments, brush settings 606 may apply to both the brush tool and the eraser tool. While this example shows an eraser tool, some embodiments may not provide an eraser tool. Some embodiments may provide one or more other user-selectable tools via which the user may perform other operations on images displayed in the image panes.

In the example control pane 620, options 624 includes a show strokes user interface element via which the user may choose to show or hide strokes on a source image, and a show regions user interface element via which the user may choose to show or hide indications of regions overlaid on the base image. While these option user interface element are shown as checkboxes, other types of user interface elements may be used to provide options to the user. Some embodiments may not provide one or both of the shown options, and some embodiments may provide one or more other options.

Figure 9B:
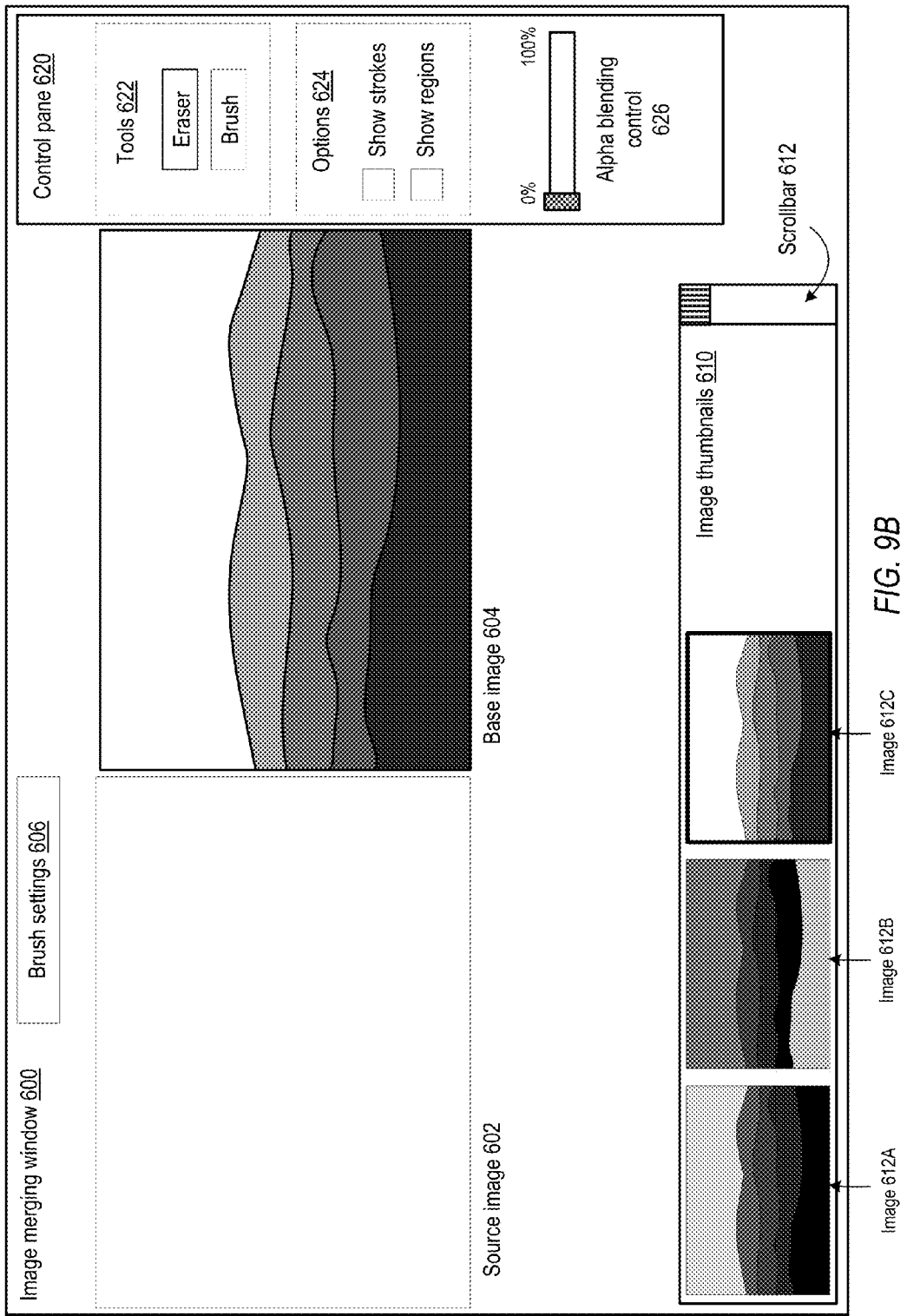

FIG. 9B shows the example image merging window 600 with an image selected and displayed as base image 604, according to some embodiments. In this example, image 612C has been selected as the base image. In some embodiments, the user interface may allow the user to select a thumbnail from thumbnails 610 and drag the selected thumbnail onto base image 604 pane to select, and display, the image as the base image. In some embodiments, other methods may be used to select an image from thumbnails 610 as the base image. In some embodiments, an indication that an image has been selected as a base image may be provided. For example, a colored border of a particular color and/or texture may be displayed around the thumbnail corresponding to the selected base image. In this example, a black border is shown around the thumbnail corresponding to the selected base image 612C.

Figure 9C:
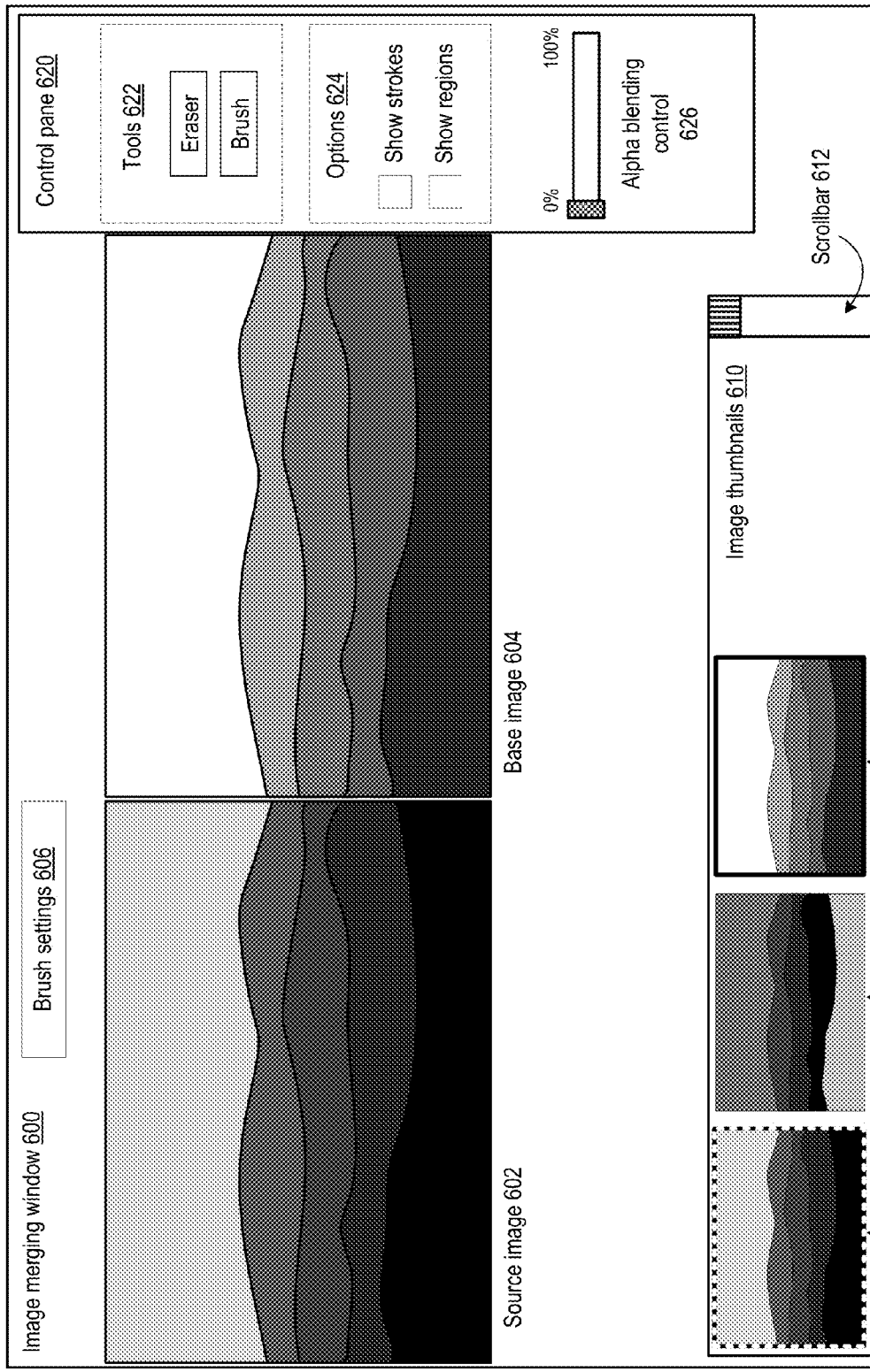

FIG. 9C shows the example image merging window 600 with an image selected and displayed as a current source image 602, according to some embodiments. In this example, image 612A has been selected as the current source image. In some embodiments, the user interface may allow the user to select a thumbnail from thumbnails 610 to be used as the source image by positioning the cursor over the thumbnail and clicking on the thumbnail. In some embodiments, the user interface may allow the user to select a thumbnail from thumbnails 610 and drag the selected thumbnail onto source image 602 pane to select, and display, the image as the current source image. In some embodiments, other methods may be used to select an image from thumbnails 610 as the current source image. In some embodiments, an indication that an image has been selected as the current source image may be provided. For example, a colored border of a particular color and/or texture may be displayed around the thumbnail corresponding to the selected source image. In this example, a black-and-white dashed border is shown around the thumbnail corresponding to the selected source image 612A.

Figure 9D:
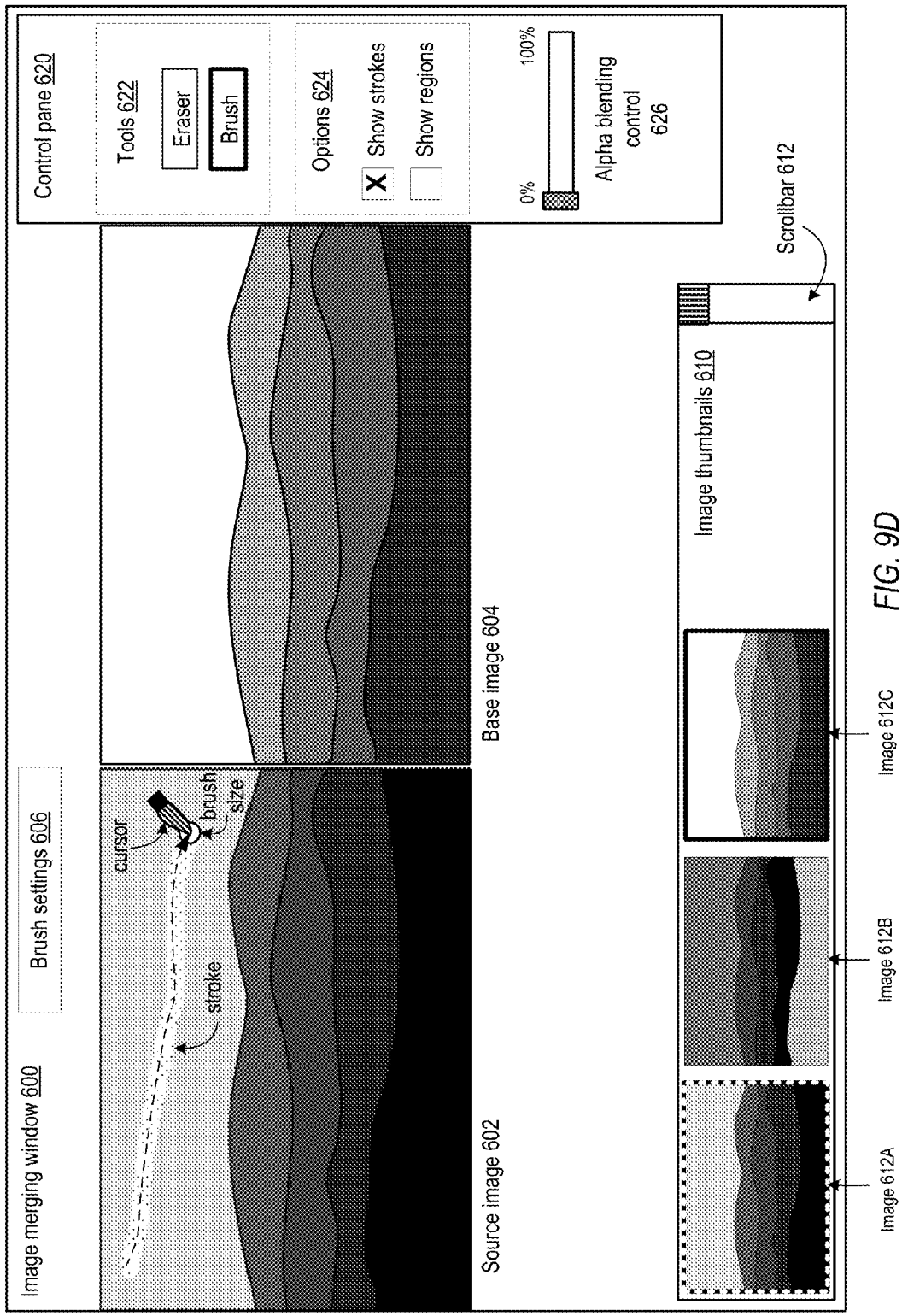

FIG. 9D illustrates the user drawing a stroke, indicated by the broad white line with black dots, in a region of the current source image 602 displayed in the example image merging window 600 to specify a region of the source image 602 that is to be blended with base image 604, according to some embodiments. In this example, the user has selected the sky region of the current source image 602, which corresponds to thumbnail 612A. In some embodiments, to draw a stroke, the user may select the stroke tool from tools 622, if necessary. In addition, the user may, if necessary or desired, modify settings of the brush using the brush settings 606 user interface. The user may also change the alpha blending setting using alpha blending control 626, if desired. The user may then position the cursor over a desired starting point in the source image 602 using a cursor control device, depress and hold down a cursor control device button, and move the cursor, in this example shown as a paint brush head, along a path in the source image 602, shown as the dashed line down the center of the stroke, using the cursor control device. Alternatively, a keyboard button, or a combination of keyboard buttons and/or cursor control buttons, may be used in drawing a stroke. In this example, the cursor is shown at the end of the stroke. The user may then release the depressed button(s) to complete the stroke.

Figure 9E:
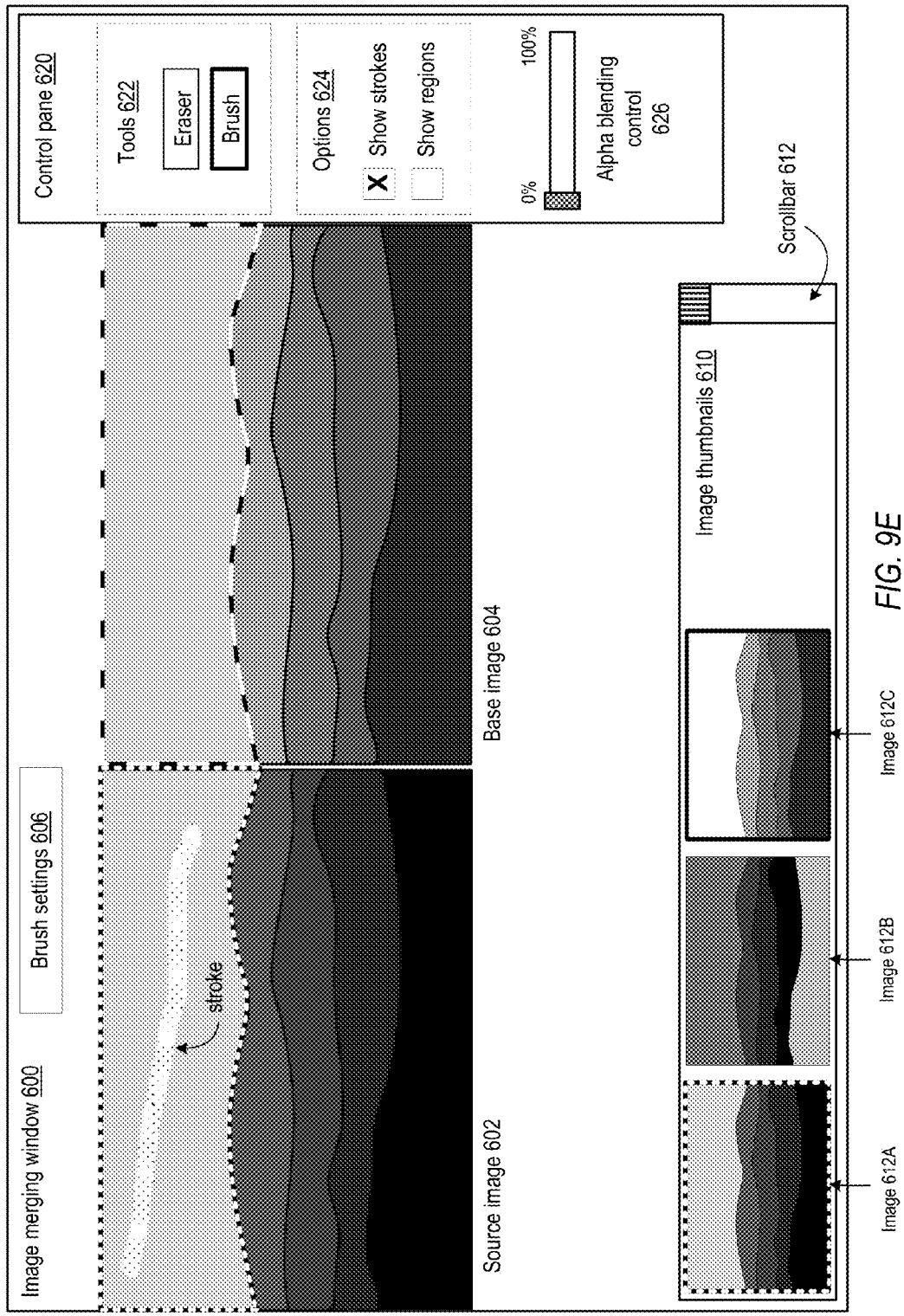

FIG. 9E shows a selected region in the source image 602, identified by the image blending module from the stroke entered by the user, blended with the corresponding region in base image 604. For illustrative purposes, the selected region in source image 602 is shown bordered by a black-and-white dotted line, and the corresponding region in base image 605 is shown bordered by a black-and-white dashed line. In some embodiments, visual indications of the selected region in source image 602 and/or of the corresponding region in base image 604 may be displayed on the respective images. Note that the coloring of the corresponding region in base image 604 is now different than the coloring of the region shown in FIGS. 9A through 9D; the pixels from the selected region in current source image 602 have been blended with the corresponding region in base image 604. Alpha blending control 626 is shown as currently set to 0% (fully opaque), so the pixels from the selected region are in effect "painted over" the pixels in the base image region.

To identify a region in the source image 602 from the stroke applied to the source image 602, some embodiments may employ a graph cut algorithm in a segmentation technique. However, other types of image processing algorithms than graph cut algorithms may be used in a segmentation technique in some embodiments. In some embodiments, pixel color values from pixels specified by the stroke may be obtained and used by the segmentation technique to segment the source image 602. As an alternative to, or in addition to, pixel color values, some embodiments may use other pixel values, for example hue or intensity values, in segmenting the image.

In some embodiments, one or more characteristics or settings of the brush used to draw a stroke may be used by the segmentation technique. For example, in some embodiments, a wider or narrower brush may be used to broaden or narrow the scope of the segmentation technique when locating a region. Thus, a broader brush may result in a larger region being located for a stroke than would be located for a similar stroke drawn with a smaller brush.

Figure 9F:
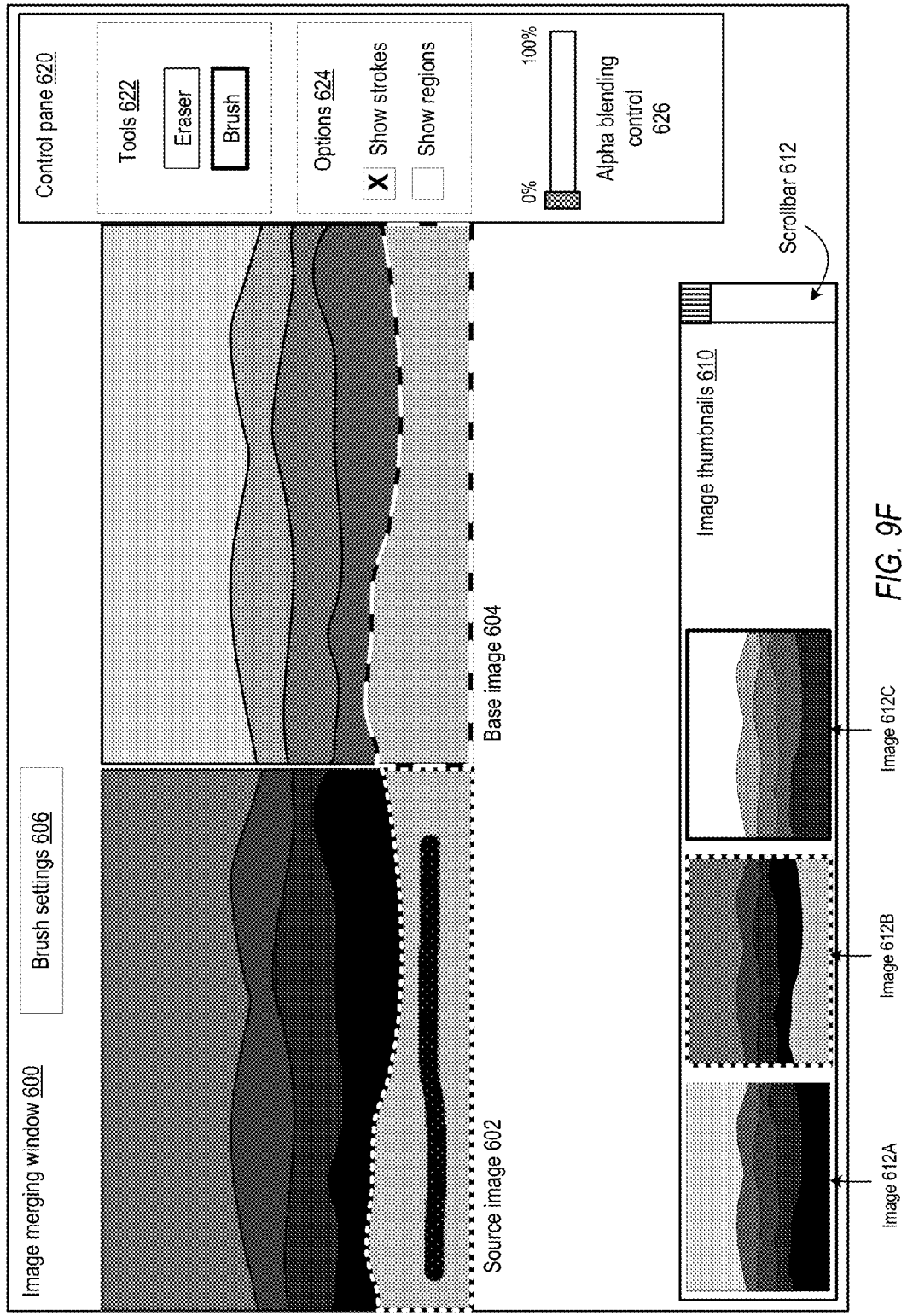

FIG. 9F shows that the user has selected the image corresponding to thumbnail 612B as the new source image 602. The user has drawn a stroke, indicated by the broad black line with white dots, in the foreground region of source image 602. The image blending module has identified a region in source image 602 from the stroke drawn by the user and blended the selected region, indicated by the black-and-white dotted line, from the current source image 602 with the corresponding region, indicated by the black-and-white dashed line line, in base image 604. The alpha blending level for this region is shown as 0% (fully opaque).

Figure 9G:
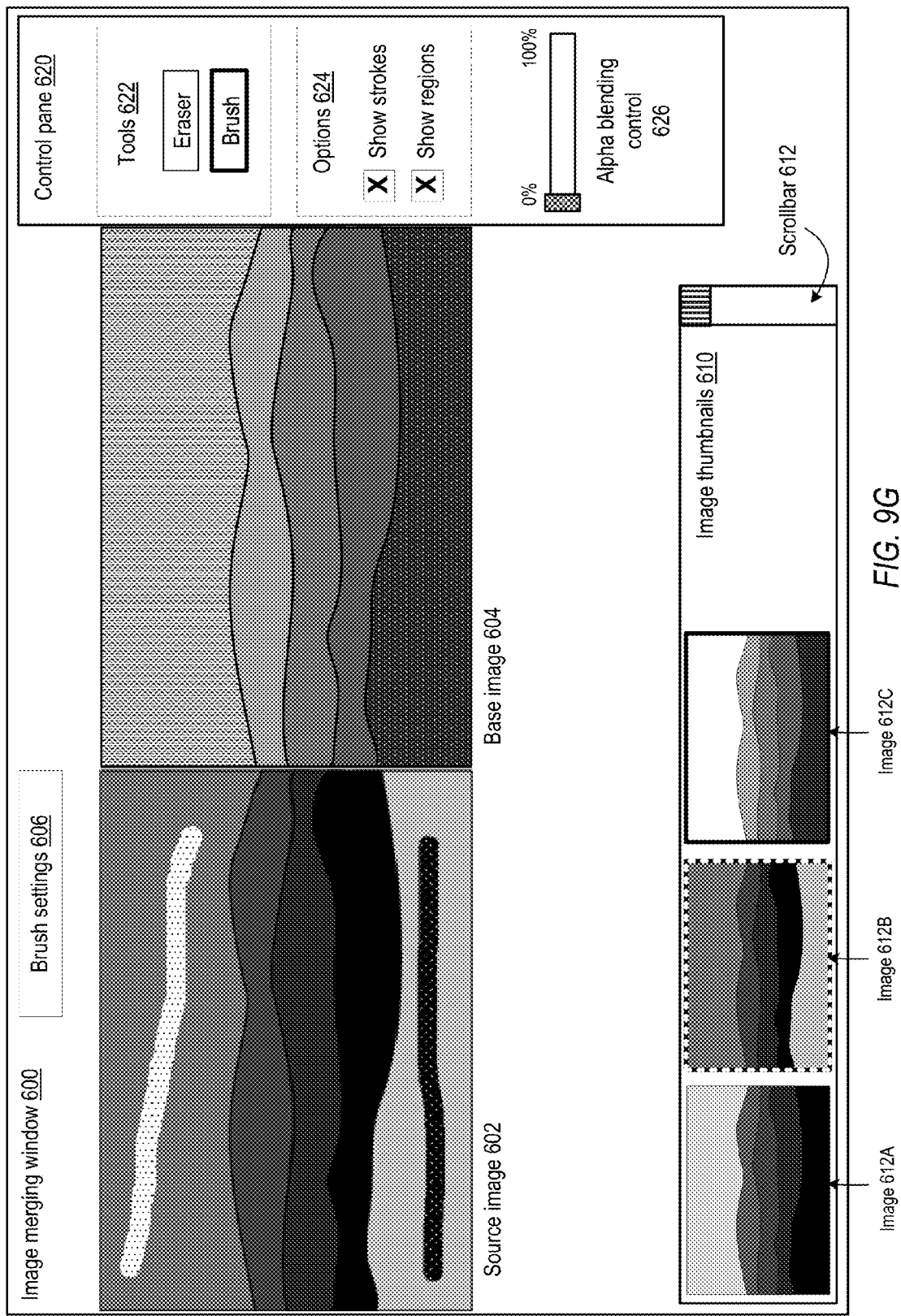

FIG. 9G shows that the user has selected both "show strokes" and "show regions" in options 624. In some embodiments, selecting the "show strokes" option causes visual indications of the strokes the user has drawn to be displayed in source image 602. In some embodiments, selecting the "show regions" option causes visual indications of the regions that have been blended from the source image(s) into the base image 604 to be displayed on base image 604, for example by outlining, coloring, shading, or texturing the regions. In some embodiments, the show strokes option and the show regions option only show strokes and regions for the current source image 602. In other embodiments, the show strokes option and the show regions option show strokes and regions from all source images that have been processed.

The user may optionally change the alpha blending level within the range of 0% (fully opaque) to 100% (fully transparent) for one or more of the regions that have been blended from the source image(s) onto the base image 604 using alpha blending control 626. FIG. 8 illustrates changing the alpha blending level for regions overlaid on a base image using layers.

Some embodiments may provide an eraser tool (or similar tool), as shown in tools 622, via which the user may erase portions of a region overlaid on base image 604. For example, in some embodiments, locations in a layer overlaid on base image 604 that are part of a selected region indicated by the layer may be modified using an eraser tool provided by the interface to change the locations from partially or fully opaque to fully transparent. While not shown, some embodiments may provide a painting or drawing tool via which the user may add to a region overlaid on base image 604. For example, in some embodiments, locations in a layer overlaid on base image 604 that are not part of a selected region indicated by the layer may be modified using a painting or drawing tool provided by the interface to change the locations from fully transparent to partially or fully opaque to cause portions of the source image corresponding to the layer to be blended with the base image. Other methods for erasing overlaid pixels and/or for adding pixels to the overlay may be used in various embodiments.

While not shown in FIGS. 9A through 9G, after a region is selected from a source image and blended with the base image, there may be areas that are either blended into or not blended into in the base image that the user desires to fix or touch up. For example, some small areas around the border of a selected region may be missed by the segmentation technique. In some embodiments, to fix such a missed area, a thinner stroke may be applied to the source image to select the region, and the selected region may be blended with the base image. See FIG. 10C for an example. In addition to missed areas, a thicker stroke may cause some areas of the source image to be blended with the base image that the user does not want to be blended. In some embodiments, such undesired areas in the blended base image may be removed by selecting the original base image (in FIGS. 9A through 9G, the image corresponding to thumbnail 512C) as the current source image 602 and applying a stroke to reselect the region from the original base image. The selected region from the original base image may then be blended with the blended base image 604. See FIGS. 10C and 10D for an example. Some embodiments may provide other methods and tools via which the user may make corrections to a blended base image.

Various embodiments of a user interface to an image blending module may provide other user interface elements for performing other tasks in an image blending workflow as described herein. As just one example, some embodiments may provide an "undo" user interface element via which a user may choose to undo one or more previous actions performed via the user interface as described above.

Figure 10A:
FIGS. 10A through 10G illustrate application of the image blending methods and workflows as described herein on example digital photographs, according to some embodiments.
Figure 10A:

FIGS. 10A through 10G illustrate application of the image blending methods and workflows as described herein on example digital photographs, according to some embodiments. FIG. 10A shows a set of two digital images captured of a scene, for example using a digital camera. Alternatively, the images may have been originally captured using a conventional film camera, and the prints or negatives subsequently digitized. For illustrative purposes, the images have been converted from the original color images to grayscale images. However, note that the methods for blending images as described herein will work for grayscale and color images. The first image, labeled as source image 700, may have been captured with a flash or other light source to illuminate the foreground, and using a relatively short exposure time, so that a good exposure of the foreground of the scene is captured; however, the background of the scene is underexposed. The second image, labeled as base image 702, may have been captured with a longer exposure time so that the background of the scene is better exposed, showing more detail; however, the foreground is less well exposed than in the first image. As shown, the user has selected the second image as the base image 702, and the first image as the current source image 700.

Figure 10B:
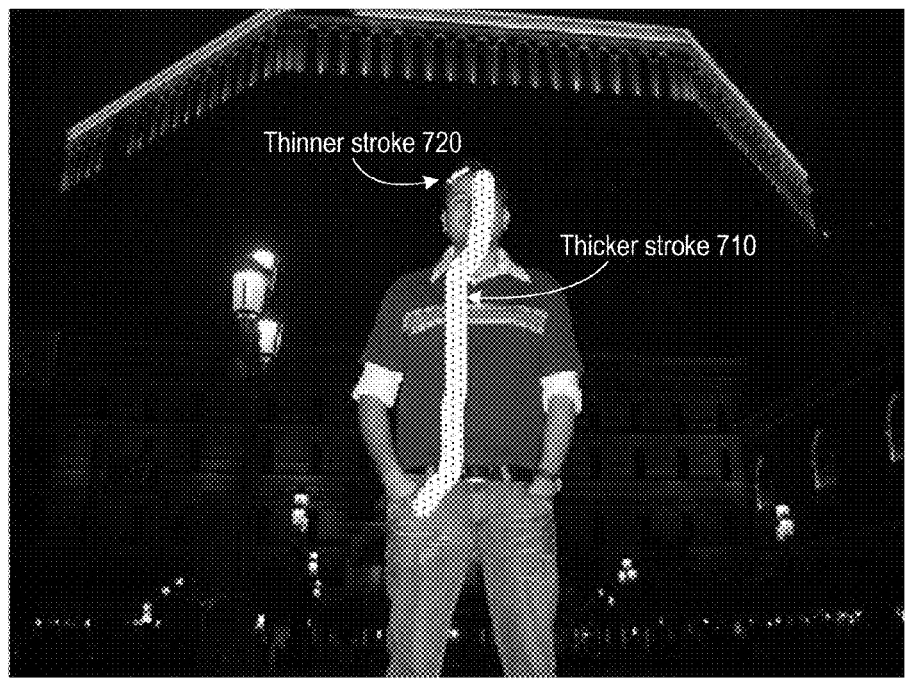
Figure 10B:

FIG. 10B shows two strokes that the user has drawn on the source image 700. The thicker stroke was applied first to select the person in the foreground. After the selected foreground region from the source image 700 (the person) is blended with the base image 702, there may be areas in the base image 702 that the user desires to fix or touch up. In this example, a small blemish around the head, caused by the hair and the background being similar in color, has been cleaned up by applying a thinner stroke to source image 700.

Figure 10C:
Figure 10C:
Figure 10D:
Figure 10D:

FIG. 10C shows the selected regions from source image 700 blended onto the base image 702 to produce blended base image 704 with an alpha level setting of 0% (fully opaque). However, a thicker stroke such as the stroke used to select the person in FIG. 10B may cause some areas of the source image 700 to be blended that the user does not want to be blended with the base image 702. For example, the triangular region below the person and between the person's legs from the source image 700 has been undesirably selected along with the person by the thicker stroke and blended with the base image 702 to produce blended base image 704 in FIG. 10C. In some embodiments, such undesired regions in the blended base image 704 may be removed as shown in FIG. 10D. In FIG. 10D, the user has selected the original base image 702 as current source image 706 and has applied a stroke to reselect the region from the original base image 702. The selected region from current source image 706 (i.e., base image 702) is blended with blended base image 704 to produce the results shown.

Figure 10E:
Figure 10E:
Figure 10F:
Figure 10F:

FIG. 10E shows that the user has switched the source image from source image 706 back to source image 702; blended base image 704 includes the regions selected from the source images as illustrated in FIGS. 10C and 10D. The alpha blending level is 0% (fully opaque). FIG. 10F shows the blended base image with the alpha blending level changed by the user to 50%.

Figure 10G:
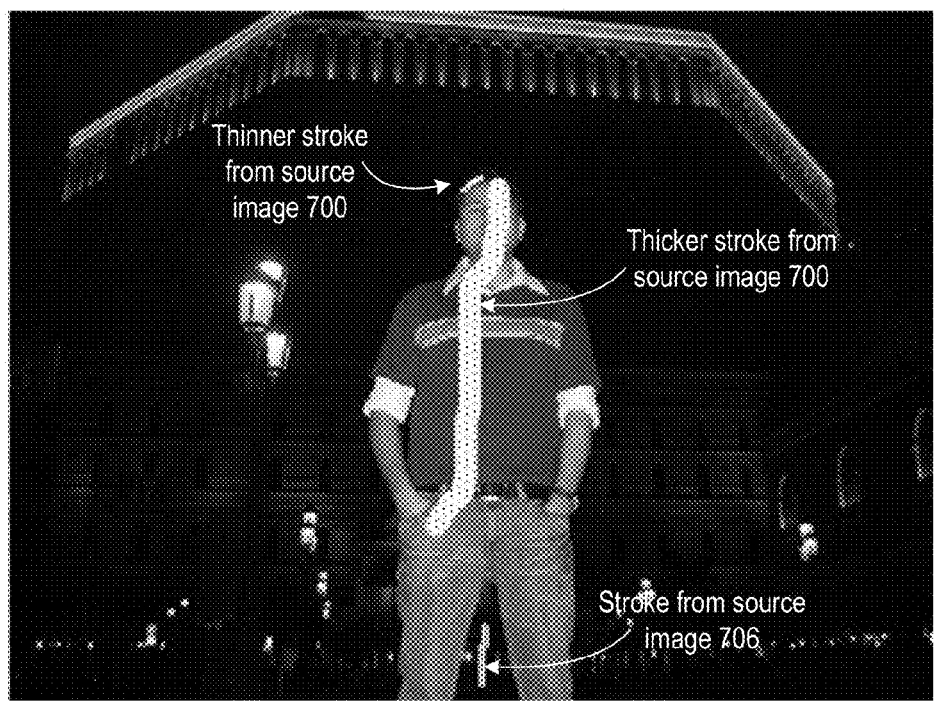
Figure 10G:

FIG. 10G shows that the user has selected to show strokes in the current source image and regions in the blended base image. This example shows all strokes made in all source images displayed on the current source image 700, and the regions from source image 700 and base image displayed on the blended base image 704.

Figure 11:
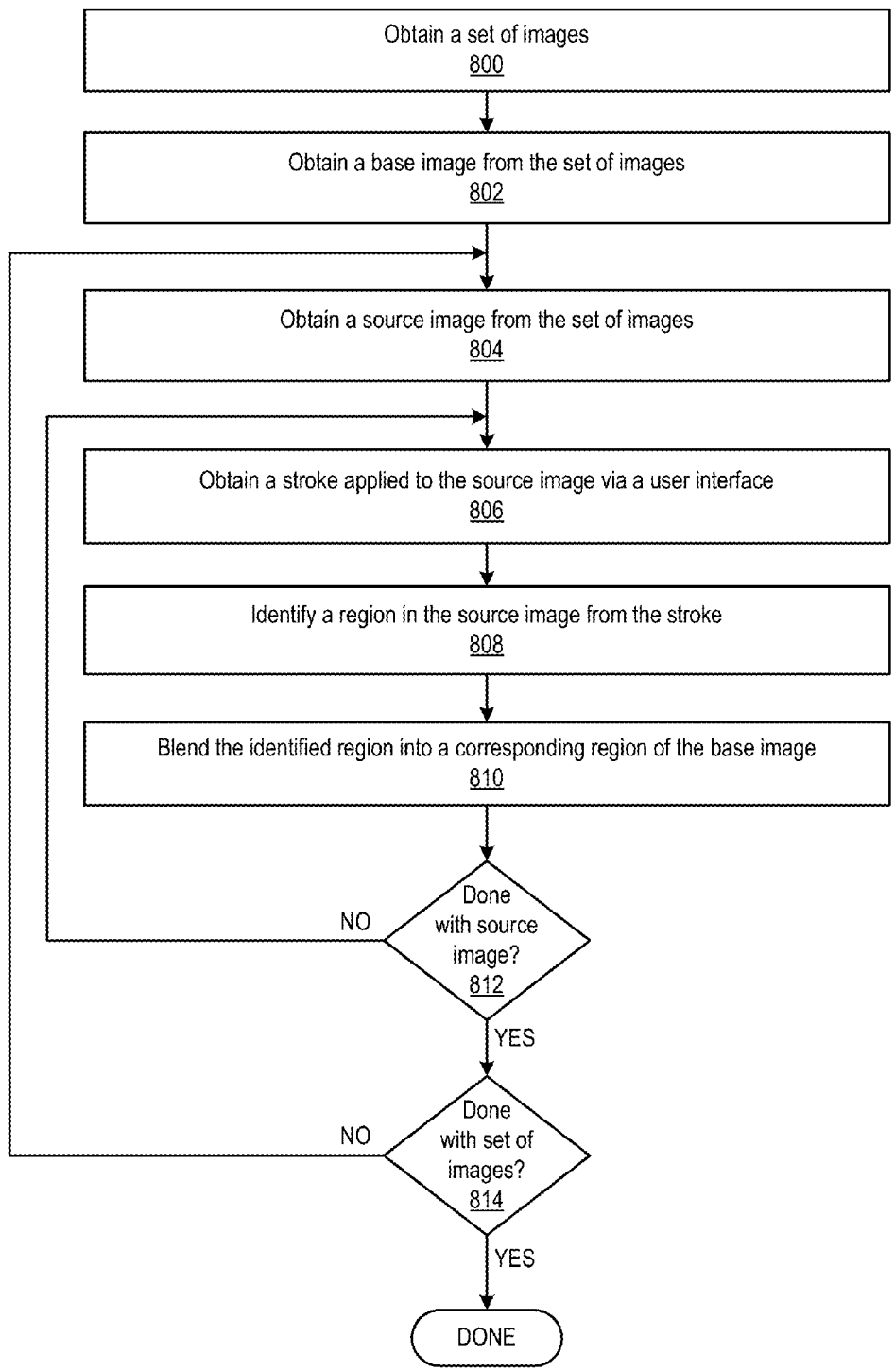
FIG. 11 is a flowchart of an example method for blending images, according to some embodiments.

FIG. 11 is a flowchart of an example method for blending images, according to some embodiments. The workflow method may be implemented via an embodiment of an image blending module. An example image blending module that may be used to implement the workflow method is shown in FIG. 14.

As indicated at 800 the image blending module may obtain a set of two or more images. An example set of two images is shown in FIG. 10A. In some embodiments, thumbnails for the images may be displayed via a user interface to the image blending module, for example as shown in FIG. 9A.

As indicated at 802, the image blending module may obtain a base image from the set of images. In some embodiments, a user interface to the image blending module may provide one or more user interface elements via which the user may select an image from among the set of images as the base image. For example, one embodiment may allow a user to select a thumbnail corresponding to the desired image from among a set of image thumbnails and drag the selected thumbnail onto a base image location of the user interface to select, and display, the corresponding image as the base image. In some embodiments, other methods may be used to select a base image.

As indicated at 804 the image blending module may obtain a source image from the set of images. In some embodiments, a user interface to the image blending module may provide one or more user interface elements via which the user may select an image from among the set of images as a source image. For example, one embodiment may allow a user to select a thumbnail corresponding to the desired image from among a set of image thumbnails to select the corresponding image as a source image. In some embodiments, other methods may be used to select a source image.

As indicated at 806 the image blending module may obtain a stroke applied to the source image via the user interface to the image blending module. The stroke may be generated, for example, by the user positioning the cursor over a desired starting point in the source image using a cursor control device, depressing and hold down a button, and moving the cursor along a path in the source image using the cursor control device.

As indicated at 808, the image blending module may identify a region in the source image from the stroke. To identify a region in the source image from the stroke applied to the source image, some embodiments may employ a graph cut algorithm in a segmentation technique. However, other types of image processing algorithms than graph cut algorithms may be used in a segmentation technique in some embodiments. In some embodiments, pixel color values from pixels specified by the stroke may be obtained and used by the segmentation technique to segment the source image. As an alternative to, or in addition to, pixel color values, some embodiments may use other pixel values, for example hue or intensity values, in segmenting the image. In some embodiments, one or more characteristics or settings of the brush used to draw a stroke may be used by the segmentation technique. For example, in some embodiments, a wider or narrower brush may be used to broaden or narrow the scope of the segmentation technique when locating a region. Thus, a broader brush may result in a larger region being located for a stroke than would be located for a similar stroke drawn with a smaller brush.

As indicated at 810, the image blending module may blend the identified region into a corresponding region of the base image. In some embodiments, to blend the identified region of the source image with the base image, pixel values from the region may be applied in a separate layer on top of the base image. Layering preserves the base image; the pixels of a selected region are not applied directly to the pixels of the base image. Other embodiments may use other methods than layering when blending the images. The image blending module may provide one or more user interface elements via which the alpha blending level for a region may be adjusted over a range from fully opaque to fully transparent.

Some embodiments of an image blending module may maintain a label map that maps each pixel in the blended base image to its corresponding source image. While not shown in FIG. 11, the method may include mapping the selected region in a label map. The image blending module may, for example, use this label map to determine all of the regions in the blended base image that are from the same source image. By determining all of the regions in the blended base image that are from a particular source image, the alpha blending level for all of these regions may be modified at one time by the user via an alpha blending level user interface element, even if regions from the same source image are in different layers in a layered image.

At 812, if the user is not done with the current source image, the user may draw another stroke on the source image, and the method may return to 806 to process the new stroke.

At 812, if the user is done with the current source image, at 814, if the user is not done with the set of images, the user may select a new source image, and the method may return to 804 to process one or more strokes applied to the new source image. Otherwise, the workflow for this set of images is done. Note that the original base image may be selected as the source image, for example to reselect one or more regions from the original source image for blending with the blended source image.

The above method describes the user applying a stroke to a source image, the image blending module identifying a region in the source image from the stroke, the image blending module blending the identified region into a corresponding region of the base image, and repeating the process for the source image if desired. Some embodiments may allow variations on the above method. Examples of variations on the above method may include, but are not limited to, the following. As one example, in some embodiments, the user may select a source image and apply multiple strokes to select various regions from that source image. After selecting the regions, an alpha blending level user interface element may be used to blend the regions with the base image. As another example, in some embodiments, the user may first select an alpha blending level using an alpha blending level user interface element and then apply strokes to select various regions from a source image. Each of the selected regions may then be automatically blended with the base image to the extent specified by the selected alpha blending level. As yet another example, in some embodiments, the user may apply a first stroke that selects a first region, and use an alpha blending level user interface element to select a first blending level. The user may then apply a second stroke and select a second region from the same source image. The second region may be automatically blended with the base image with the first blending level. The user may then change the blending level. In response, the blending of both the first region and the second region is automatically changed from the first blending level to the new blending level.

Selecting and Blending the Same Region from Multiple Source Images

Figure 12:
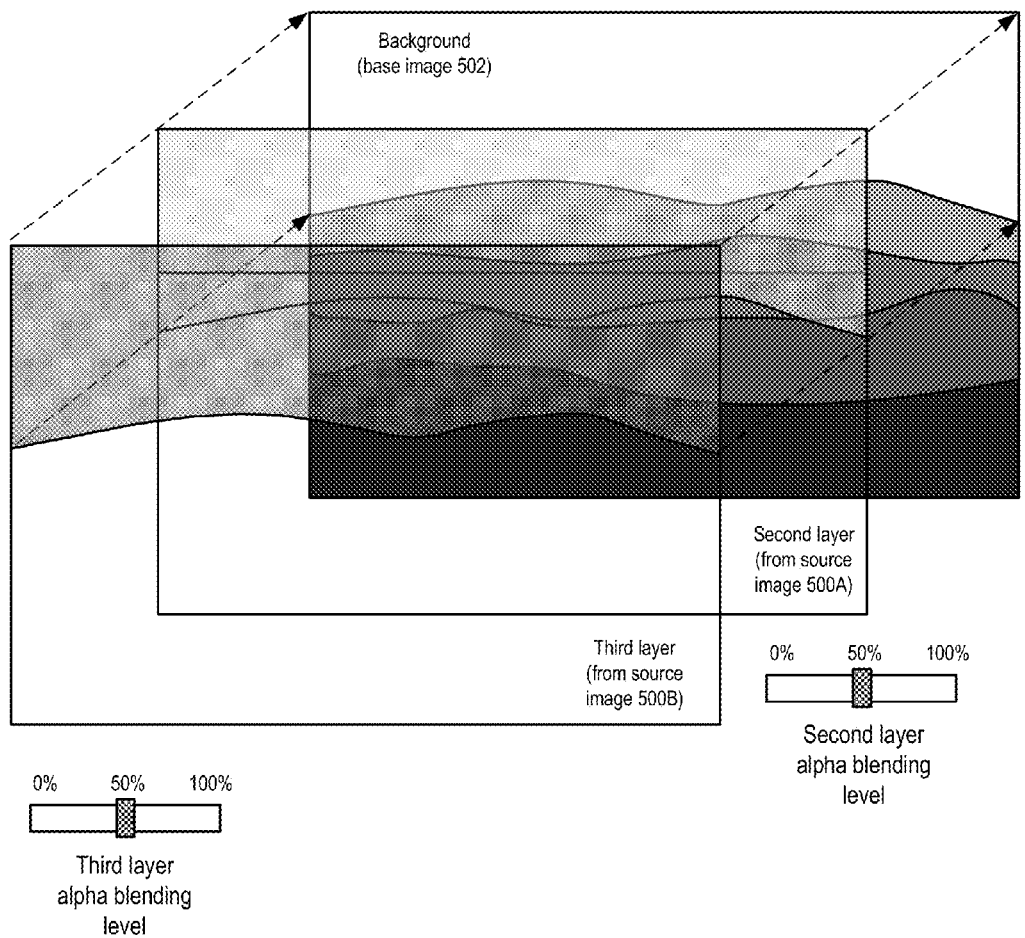
FIG. 12 illustrates the same region selected from multiple source images and blended with a base image, according to some embodiments.
Figure 13:
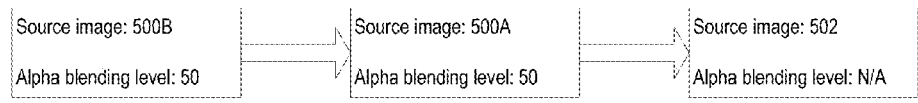
FIG. 13 is a block diagram illustrating an example source vector from a label map that indicates each source image that is a source for a particular pixel in a blended image, according to some embodiments.

Exposure bracketing is a fairly advanced photographic technique in which a photographer captures multiple images at different exposure levels to capture detail at several different levels. Three, four, five or even more images may be captured, with the exposure levels appropriately spaced. In some such images, different details of a region may be visible in different ones of the images. In order to capture all the details in a final image, the user needs a way in which the region can be selected from all of the source images that include some details in that region. Thus, some embodiments may provide a method and one or more user interface elements via which the user may select a single region from multiple source images and alpha blend the region from the source images with the selected base image to obtain the various details in the region captured in the different images. A user interface to an image blending module such as the interface illustrated in FIGS. 9A through 9G may be used to select the same region from multiple source images for blending with a base image. FIG. 12 illustrates the same region (the sky region) selected from multiple source images (in this example, source images 500A and 500B from FIG. 5A) and blended with a base image (in this example, base image 502 from FIG. 5A), with the alpha blending level for the sky region in both source images set to 50%. To accomplish this, some embodiment may provide a label map in which each pixel in the blended image may be mapped to multiple source images using a vector that indicates all of the source images used to blend the respective pixel. FIG. 13 is a block diagram illustrating an example source vector from a label map for a pixel that is blended from a source pixel in image 500B and a source pixel in image 500A with a base or background pixel in base image 502. An indication of each source image that is a source for the particular pixel in the blended image may be included in the source vector. Other information may be indicated in the source vector for each source image, for example the alpha blending level for the region from the respective source image may be indicated. The vector may also indicate the order in which the regions from the source images are applied to the base image (i.e., from a top source image to a bottom source image, with the bottom source image being the first layer above the base image).

While FIG. 12 shows the regions from the different source images as identical (both corresponding to exactly the same region in the base image), in practice, the regions may be identical as shown or the regions may be overlapping regions that are not identical (each corresponding to a different but overlapping region in the base image).

Example Implementations

FIG. 14 illustrates an example image blending module 920 that may implement image blending methods and workflows as illustrated in FIGS. 1A through 13. Embodiments of an image blending module 920 may, for example, be implemented as a stand-alone image processing application, as a module of an image processing application, as a plug-in for applications including image processing applications, and/or as a library function or functions that may be called by other applications. Embodiments of image blending module 920 may be implemented in any image processing application, including but not limited to Adobe® PhotoShop® Adobe® PhotoShop® Elements®, and Adobe® After Effects®. FIG. 15 illustrates an example computer system on which embodiments of image blending module 920 may be implemented.

Image blending module 920 receives as input a set of two or more digital images 910. An example set of input images is shown in FIG. 10A. Image blending module 920 facilitates workflows and methods as described herein for blending input images 910 according to user input 912 received via user interface 922. An example user interface 922 to an image blending module 920, and an example of an image blending workflow to blend an example set of images, is illustrated in FIGS. 9A through 9G. Image blending module 920 generates as output one or more blended images 930. Example blended images are shown in FIGS. 10E and 10F as blended base image 704. A blended image 930 may, for example, be printed, displayed on a display device, transmitted to other computer systems via wired or wireless communication media, and/or stored to a storage medium 940, such as system memory, a disk drive, DVD, CD, etc. A blended image 930 may be further processed according to the image blending methods described herein, and/or may be further processed according to other image processing methods and techniques.

Program instructions and/or data for implementing embodiments of an image blending module as described herein may, for example, be stored on a computer-readable storage medium. A computer-readable storage medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc.

Example System

Embodiments of an image blending module as described herein may be executed on one or more computer systems, which may interact with various other devices. One such computer system is illustrated by FIG. 15. In different embodiments, computer system 700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of an image blending module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 15, memory 1020 may include program instructions 1025, configured to implement embodiments of an image blending module as described herein, and data storage 1035, comprising various data accessible by program instructions 1025. In one embodiment, program instructions 1025 may include software elements of embodiments of an image blending module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of an image blending module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
    obtaining a plurality of images of a scene, one of the images comprising a base image and a different one of the images comprising a source image;
    obtaining input indicating a stroke applied to the source image, the stroke specifying a set of pixels in the source image and having multiple characteristics including a speed of the stroke and a direction of the stroke;
    identifying a region of the source image from the stroke, the region comprising a plurality of contiguous pixels in the source image, the identifying including determining that the plurality of pixels in the region is similar to the pixels in the set of pixels specified by the stroke according to segmentation parameters used to segment the region of the source image from other regions of the source image, at least one of the segmentation parameters being based on at least one of the speed of the stroke or the direction of the stroke; and
    blending the pixels from the region of the source image with pixels in a corresponding region of the base image to generate a blended image.

2. The computer-implemented method as recited in claim 1, further comprising:
    obtaining input indicating another stroke applied to the source image, wherein the other stroke specifies a different set of pixels in the source image;
    identifying a different region of the source image from the other stroke, wherein the different region comprises a different plurality of contiguous pixels in the source image; and
    blending the pixels from the different region of the source image with pixels in a corresponding region of the blended image to generate a new blended image.

3. The computer-implemented method as recited in claim 1, further comprising:
    obtaining input selecting a different one of the plurality of images as a second source image;
    obtaining input indicating a stroke applied to the second source image, wherein the stroke applied to the second source image specifies a set of pixels in the second source image;
    identifying a region of the second source image from the stroke applied to the second source image, wherein the region of the second source image comprises a plurality of contiguous pixels in the second source image; and
    blending the pixels from the region of the second source image with pixels in a corresponding region of the blended image to generate a new blended image.

4. The computer-implemented method as recited in claim 3, wherein the region of the source image and the region of the second source image correspond to the same region of the base image.

5. The computer-implemented method as recited in claim 3, wherein the region of the source image and the region of the second source image correspond to different, non-overlapping regions of the base image.

6. The computer-implemented method as recited in claim 3, wherein the region of the source image and the region of the second source image correspond to different, overlapping regions of the base image.

7. The computer-implemented method as recited in claim 3, wherein blending the pixels from the region of the second source image with pixels in the corresponding region of the blended image to generate the new blended image comprises:
   obtaining input specifying a different blending level for the region in the second source image than a blending level that was used to blend the region from the source image, wherein a blending level for a region is adjustable within a range from fully opaque to fully transparent, inclusive; and
   blending the pixels from the region of the second source image with the pixels in the corresponding region of the base image according to the different blending level to generate the new blended image.

8. The computer-implemented method as recited in claim 1, wherein said determining that the plurality of pixels in the region is similar to the pixels in the set of pixels specified by the stroke is performed according to a graph cut algorithm.

9. The computer-implemented method as recited in claim 1, wherein determining that the plurality of pixels in the region is similar to the pixels in the set of pixels specified by the stroke is performed based in part on one or more characteristics of the pixels that include color of the pixels.

10. The computer-implemented method as recited in claim 1, wherein blending the pixels from the region of the source image with pixels in the corresponding region of the base image to generate the blended image comprises applying the pixels in the region of the source image to the base image in a layer overlaid on the base image.

11. The computer-implemented method as recited in claim 1, wherein blending the pixels from the region of the source image with pixels in the corresponding region of the base image to generate the blended image is performed according to alpha channel blending.

12. The computer-implemented method as recited in claim 1, wherein the stroke is applied to the source image via a user interface using a cursor controlled by a cursor control device, wherein the user interface provides one or more user interface elements via which the width of a stroke applied to a source image via the cursor control device is adjustable to different widths, and wherein, in identifying the region of the source image from the stroke, the width of the stroke applied to the source image affects the size of the region that is identified.

13. The computer-implemented method as recited in claim 1, wherein, in identifying the region of the source image from the stroke, one or more of the multiple characteristics of the stroke affect the size of the region that is identified.

14. The computer-implemented method as recited in claim 1, wherein the multiple characteristics of the stroke include the width of the stroke and the length of the stroke.

15. The computer-implemented method as recited in claim 3, further comprising:
   obtaining input specifying a different blending level for the region in the second source image than a blending level that was used to blend the region from the source image, wherein a blending level for a region is adjustable within a range from fully opaque to fully transparent, inclusive; and
   blending the pixels from the region of the source image with the pixels in the corresponding region of the base image according to the different blending level to generate a new blended image.

16. A system, comprising:
   at least one processor; and
   a memory comprising program instructions that are executable by the at least one processor to perform operations comprising:
      obtaining a plurality of images of a scene, one of the images comprising a base image and a different one of the images comprising a source image;
      obtaining input indicating one or more strokes applied to the source image, the strokes each specifying a distinct set of pixels in the source image and having multiple characteristics including a speed of the stroke and a direction of the stroke;
      identifying one or more regions of the source image from the one or more strokes, each of the one or more regions comprising a plurality of contiguous pixels in the source image, the identifying including determining that the plurality of pixels in the region is similar to the pixels in the set of pixels specified by the respective stroke according to segmentation parameters used to segment the one or more regions of the source image from other regions of the source image, at least one of the segmentation parameters being based on at least one of the speed of the respective stroke or the direction of the respective stroke; and
      blending the pixels from the one or more regions of the source image with pixels in one or more corresponding regions of the base image to generate a blended image.

17. The system as recited in claim 16, wherein the operations further comprise:
   obtaining input selecting a different one of the plurality of images as a second source image;
   obtaining input indicating one or more strokes applied to the second source image, wherein the one or more strokes applied to the second source image each specify a distinct set of pixels in the second source image;
   identifying one or more regions of the second source image from the one or more strokes applied to the second source image, wherein each of the one or more regions of the second source image comprises a plurality of contiguous pixels in the second source image; and
   blending the pixels from the one or more regions of the second source image with pixels in corresponding regions of the blended image to generate a new blended image.

18. A computer-readable memory storing program instructions that are computer-executable to implement an image blending module configured to perform operations comprising:
   obtaining a plurality of images of a scene, one of the images comprising a base image and a different one of the images comprising a source image;
   obtaining input indicating one or more strokes applied to the source image, the strokes each specifying a distinct set of pixels in the source image and having multiple characteristics including a speed of the stroke and a direction of the stroke;
   identifying one or more regions of the source image from the one or more strokes, each of the one or more regions comprising a plurality of contiguous pixels in the source image, the identifying including determining that the plurality of pixels in the region is similar to the pixels in the set of pixels specified by the respective stroke according to segmentation parameters used to segment the one or more regions of the source image from other regions of the source image, at least one of the segmentation parameters being based on at least one of the speed of the respective stroke or the direction of the respective stroke; and
   blending the pixels from the one or more regions of the source image with pixels in one or more corresponding regions of the base image to generate a blended image.

19. The computer-readable memory as recited in claim 18, wherein the operations further comprise:
  obtaining input selecting a different one of the plurality of images as a second source image;
  obtaining input indicating one or more strokes applied to the second source image, wherein the one or more strokes applied to the second source image each specify a distinct set of pixels in the second source image;
  identifying one or more regions of the second source image from the one or more strokes applied to the second source image, wherein each of the one or more regions of the second source image comprises a plurality of contiguous pixels in the second source image; and
  blending the pixels from the one or more regions of the second source image with pixels in corresponding regions of the blended image to generate a new blended image.

20. The system as recited in claim 16, wherein the operations further comprise optionally displaying the blended image with one or more different visual indicators each applied to respective said regions to indicate that the one or more regions blended into the base image are sourced from different images.

\* \* \* \* \*

UNITED STATES PATENT AND TRADEMARK OFFICE
CERTIFICATE OF CORRECTION

| | | |
|---|---|---|
| PATENT NO. | : 8,644,644 B2 | Page 1 of 1 |
| APPLICATION NO. | : 12/559214 | |
| DATED | : February 4, 2014 | |
| INVENTOR(S) | : Vikas Yadav | |

It is certified that error appears in the above-identified patent and that said Letters Patent is hereby corrected as shown below:

On the title page item [73], after "Adobe Systems" delete "Incorporation", insert -- Incorporated --, therefor.

Signed and Sealed this
Fifteenth Day of April, 2014

Michelle K. Lee
*Deputy Director of the United States Patent and Trademark Office*